(12) United States Patent
Hu

(10) Patent No.: US 12,489,908 B2
(45) Date of Patent: Dec. 2, 2025

(54) MEDIA FILE ENCAPSULATION METHOD AND APPARATUS, DEVICE AND STORAGE MEDIUM

(71) Applicant: TENCENT TECHNOLOGY (SHENZHEN) COMPANY LIMITED, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 53 days.

(21) Appl. No.: 18/636,394

(22) Filed: Apr. 16, 2024

(65) Prior Publication Data

US 2024/0259572 A1    Aug. 1, 2024

Related U.S. Application Data

(63) Continuation of application No. PCT/CN2022/118309, filed on Sep. 13, 2022.

(30) Foreign Application Priority Data

Oct. 25, 2021   (CN) .......................... 202111241064.7

(51) Int. Cl.
 *H04N 19/184*   (2014.01)
 *H04N 19/46*   (2014.01)
 *H04N 19/70*   (2014.01)

(52) U.S. Cl.
 CPC .......... *H04N 19/184* (2014.11); *H04N 19/46* (2014.11); *H04N 19/70* (2014.11)

(58) Field of Classification Search
 CPC ...... H04N 19/184; H04N 19/46; H04N 19/70; H04N 21/8455; H04N 21/85406; H04N 19/44
 See application file for complete search history.

(56) References Cited

U.S. PATENT DOCUMENTS 10,404,411 B2   9/2019   Chen et al.
10,542,297 B2   1/2020   Chen et al.
(Continued)

FOREIGN PATENT DOCUMENTS

CN   111435989 A   7/2020
CN   111526368 A   8/2020
(Continued)

OTHER PUBLICATIONS

The World Intellectual Property Organization (WIPO) International Search Report for PCT/CN2022/118309 Dec. 14, 2022 7 Pages (including translation).

(Continued)

*Primary Examiner* — Richard T Torrente
(74) *Attorney, Agent, or Firm* — Anova Law Group, PLLC

(57) ABSTRACT

A media file de-encapsulation method includes obtaining a video track. The video bit stream comprises a track header and a video bit stream, and the track header comprises sequence header information corresponding to a non-duplicate sequence header in the video bit stream. The method also includes: de-encapsulating the video track to obtain the sequence header information and the video bit stream; and decoding the video bit stream according to the sequence header information, to obtain a decoded video.

16 Claims, 4 Drawing Sheets

A file de-encapsulation device obtains a video track, the video track including a track header and a video bit stream, and the track header including sequence header information corresponding to a non-duplicate sequence header in the video bit stream — S701

The file de-encapsulation device de-encapsulates the video track to obtain the sequence header information and the video bit stream — S702

The file de-encapsulation device decodes the video bit stream according to the sequence header information, to obtain a decoded video — S703

(56) References Cited

U.S. PATENT DOCUMENTS

| | | | |
|---|---|---|---|
| 10,623,635 | B2 | 4/2020 | Wang et al. |
| 2010/0189181 | A1 | 7/2010 | Zheng et al. |
| 2018/0075576 | A1 | 3/2018 | Liu et al. |
| 2018/0109817 | A1 | 4/2018 | Wang et al. |
| 2018/0199042 | A1 | 7/2018 | Wang et al. |
| 2018/0199044 | A1 | 7/2018 | Wang et al. |
| 2018/0213300 | A1 | 7/2018 | Chen et al. |
| 2018/0261254 | A1 | 9/2018 | Wang et al. |
| 2019/0045238 | A1 | 2/2019 | Lai et al. |
| 2019/0349296 | A1 | 11/2019 | Liu |
| 2019/0364259 | A1 | 11/2019 | Chen et al. |
| 2021/0194946 | A1* | 6/2021 | Hannuksela ..... H04N 21/85406 |
| 2022/0337846 | A1* | 10/2022 | Ouedraogo ........ H04N 21/8451 |

FOREIGN PATENT DOCUMENTS

| | | |
|---|---|---|
| CN | 113347424 A | 9/2021 |
| CN | 113973210 A | 1/2022 |
| EP | 3866478 A1 | 8/2021 |
| GB | 201014702 | 10/2010 |
| WO | 2018133172 A1 | 7/2018 |
| WO | 2020151274 A1 | 7/2020 |
| WO | 2020229734 A1 | 11/2020 |

OTHER PUBLICATIONS

China National Intellectual Property Administration (CNIPA) Office Action 1 for 202111241064.7 May 19, 2022 11 Pages (including translation).
GB, AVS3—Part 2 Video (WD 8.0), accessed Apr. 2024.
ISOIEC 23001-6 Part 6_Dynamic adaptive streaming over Http (DASH), Aug. 12, 2019 (Aug. 12, 2019).
ISOIEC 14496-12 Part 12_ISO base media file format, Sep. 2022 (Sep. 2022).
Shuai Zhao et al. "Study of user QoE improvement for dynamic adaptive streaming over HTTP (MPEG-DASH)." 2017 International Conference on Computing, Networking and Communications (ICNC). IEEE, 2017.
Yan Zhou et al., "Fast sample adaptive offset algorithm for 360-degree video coding." Signal Processing: Image Communication 80 (2020): 115634.
Xiang Zhang et al., "Implicit geometry partition for point cloud compression." 2020 Data Compression Conference (DCC). IEEE, 2020.
Xiang Zhang et al., "Linear model based geometry coding for LiDAR acquired point clouds." arXiv preprint arXiv:2001.03871 (2020).
Honglian Wei et al. "Enhanced intra prediction scheme in point cloud attribute compression." 2019 IEEE Visual Communications and Image Processing (VCIP). IEEE, 2019.
Min Zhang et al. "Pointhop: An explainable machine learning method for point cloud classification." IEEE Transactions on Multimedia 22.7 (2020): 1744-1755.
Li Li et al. "Occupancy-map-based rate distortion optimization for video-based point cloud compression." 2019 IEEE International Conference on Image Processing (ICIP). IEEE, 2019.
Li Li et al. "Occupancy-map-based rate distortion optimization and partition for video-based point cloud compression." IEEE Transactions on Circuits and Systems for Video Technology 31.1 (2020): 326-338.
Li Li et al. "Video-based compression for plenoptic point clouds." arXiv preprint arXiv: 1911.01355 (2019).
Li Li et al. "A-Domain perceptual rate control for 360-degree video compression." IEEE Journal of Selected Topics in Signal Processing 14.1 (2019): 130-145.
Li Li et al. "Efficient projected frame padding for video-based point cloud compression." IEEE Transactions on Multimedia 23 (2020): 2806-2819.
Li Li et al. "Rate control for video-based point cloud compression." IEEE Transactions on Image Processing 29 (2020): 6237-6250.
Min Zhang et al. "Unsupervised feedforward feature (UFF) learning for point cloud classification and segmentation." 2020 IEEE International Conference on Visual Communications and Image Processing (VCIP). IEEE, 2020.
Pranav Kadam et al. "Unsupervised point cloud registration via salient points analysis (SPA)." 2020 IEEE International Conference on Visual Communications and Image Processing (VCIP). IEEE, 2020.

* cited by examiner

MEDIA FILE ENCAPSULATION METHOD AND APPARATUS, DEVICE AND STORAGE MEDIUM

CROSS-REFERENCES TO RELATED APPLICATIONS

This application is a continuation application of PCT Patent Application No. PCT/CN2022/118309 filed on Sep. 13, 2022, which claims priority to Chinese Patent Application No. 202111241064.7, filed with the China National Intellectual Property Administration on Oct. 25, 2021, and entitled "MEDIA FILE ENCAPSULATION METHOD AND APPARATUS, DEVICE AND STORAGE MEDIUM", the entire contents of both of which are incorporated herein by reference.

FIELD OF THE TECHNOLOGY

Embodiments of the present disclosure relate to the technical field of video processing, in particular to a media file encapsulation method and apparatus, a device and a storage medium.

BACKGROUND OF THE DISCLOSURE

A digital video technology can be integrated to a variety of video apparatuses, such as a digital television, a smart phone, a computer, an electronic reader, or a video player. With the development of a video technology, video data includes a large amount of data. In order to facilitate transmission of the video data, a video apparatus implements a video compression technology to make the video data transmitted or stored more effectively. A video is compressed to form a code stream which is encapsulated to obtain a media file. The media file is sent to a decoder side for decoding consumption. In order to facilitate the decoder side to accurately decode the code stream, there may be one or more sequence headers in the code stream. However, a current encapsulation technology has a problem of low decoding efficiency when there are a plurality of sequence headers in a code stream.

SUMMARY

The present disclosure provides a media file encapsulation method and apparatus, a device and a storage medium, to improve the decoding efficiency of a video file.

The present disclosure provides a media file encapsulation method, which is applied to a file encapsulation device, the file encapsulation device being understood as a video encapsulation device or coding device, and the method including: obtaining a video bit stream, the video bit stream including at least one sequence header; determining, according to the at least one sequence header, sequence header information corresponding to the video bit stream; and encapsulating the video bit stream to obtain a video track, a track header of the video track including sequence header information corresponding to a non-duplicate sequence header in the video bit stream.

The present disclosure provides a media file de-encapsulation method, which is applied to a file de-encapsulation device, the file de-encapsulation device being understood as a video de-encapsulation device or a decoding device, and the method including: obtaining a video track, the video track including a track header and a video bit stream, and the track header including sequence header information corresponding to a non-duplicate sequence header in the video bit stream; de-encapsulating the video track to obtain the sequence header information and the video bit stream; and decoding the video bit stream according to the sequence header information, to obtain a decoded video.

The present disclosure provides a media file encapsulation apparatus, which is applied to a file encapsulation device, the apparatus including: an obtaining unit, configured to obtain a video bit stream, the video bit stream including at least one sequence header; a determining unit, configured to determine, according to the at least one sequence header, sequence header information corresponding to the video bit stream; and an encapsulation unit, configured to encapsulate the video bit stream to obtain a video track, the video track including sequence header information corresponding to a non-duplicate sequence header in the video bit stream.

The present disclosure provides a media file de-encapsulation apparatus, which is applied to a file de-encapsulation device, the apparatus including: an obtaining unit, configured to obtain a video track, the video track including a track header and a video bit stream, and the track header including sequence header information corresponding to a non-duplicate sequence header in the video bit stream; a de-encapsulation unit, configured to de-encapsulate the video track to obtain the sequence header information and the video bit stream; and a decoding unit, configured to decode the video bit stream according to the sequence header information, to obtain a decoded video.

The present disclosure provides a file encapsulation device, including: a processor and a memory, the memory being configured to store a computer program, and the processor being configured to invoke and operate the computer program stored in the memory, to implement the media file encapsulation methods of the various embodiments.

The present disclosure provides a file de-encapsulation device, including: a processor and a memory, the memory being configured to store a computer program, and the processor being configured to invoke and operate the computer program stored in the memory, to implement the media file de-encapsulation methods of the various embodiments.

The present disclosure provides an electronic device, including: a processor and a memory, the memory being configured to store a computer program, and the processor being configured to invoke and operate the computer program stored in the memory, to implement the methods of the various embodiments.

The present disclosure provides a non-transitory computer-readable storage medium, configured to store a computer program which causes a computer to implement the methods of the various embodiments.

In summary, in the present disclosure, the file encapsulation device encapsulates the video bit stream to obtain the sequence header information corresponding to the video bit stream in the video track. In this way, the file de-encapsulation device parses the sequence header information in the video track, and decodes the video bit stream according to the sequence header information, so that the video bit stream decoding efficiency can be improved. For example, when the video bit stream includes a plurality of duplicate sequence headers, one sequence header can be decoded to decode subsequent video bit streams, thus avoiding a problem of repeatedly decoding sequence headers. For another example, when the video bit stream includes a plurality of different sequence headers, the file de-encapsulation device determines, according to the plurality of different sequence headers before decoding the video bit stream, whether a decoder has an ability of decoding the video bit stream corresponding to the plurality of different sequence headers, thereby avoiding a problem that some video bit streams cannot be decoded after some video bit streams are decoded, and improving the video decoding efficiency.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by persons of ordinary skill in the art based on the embodiments of the present disclosure without creative efforts shall fall within the protection scope of the present disclosure.

It is noted that in the specification, claims, and the foregoing accompanying drawings of the present disclosure, the terms "first", "second", and so on are intended to distinguish between similar objects rather than indicating a specific order. It is to be understood that data used in this way is exchangeable in a proper case, so that the embodiments of the present disclosure described herein can be implemented in an order different from the order shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The present disclosure can be applied to the fields of picture coding and decoding, video coding and decoding, hardware video coding and decoding, special circuit video coding and decoding, real-time video coding and decoding, and the like. For example, the scheme of the present disclosure can be combined with audio video coding standard (AVS), for example, H.264/audio video coding (AVC) standard, H.265/high efficiency video coding (HEVC) standard and H.266/versatile video coding (VVC) standard. Alternatively, the scheme of the present disclosure can be combined with other proprietary or industrial standards including ITU-TH.261, ISO/IECMPEG-1 Visual, ITU-TH.262 or ISO/IECMPEG-2Visual, ITU-TH.263, ISO/IECMPEG-4Visual, ITU-TH.264 (also referred to as ISO/IECMPEG-4AVC), including scalable video codec (SVC) and multi-view video codec (MVC) extensions. It is understood that the technologies of the present disclosure are not limited to any specific codec standard or technology.

Figure 1:
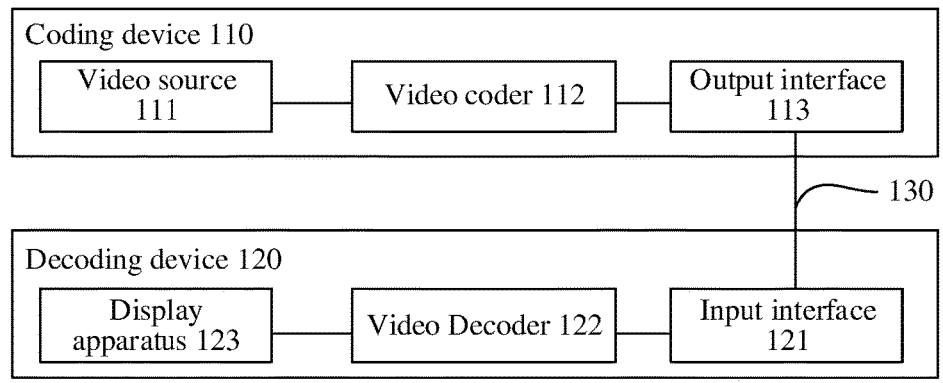
FIG. 1 is a schematic block diagram of a video coding and decoding system according to an embodiment of the present disclosure.

In order to facilitate understanding, a video coding and decoding system involved in an embodiment of the present disclosure is first introduced in combination with FIG. 1.

FIG. 1 is a schematic block diagram of a video coding and decoding system according to an embodiment of the present disclosure. It is noted that FIG. 1 is just an example. The video coding and decoding system in this embodiment of the present disclosure includes but is not limited to that shown in FIG. 1. As shown in FIG. 1, the video coding and decoding system 100 includes a coding device 110 and a decoding device 120. The coding device is configured to code (which can be understood as compression) video data to generate a code stream, and transmit the code stream to the decoding device. The decoding device decodes the code stream coded by the coding device to obtain decoded video data.

The coding device 110 in this embodiment of the present disclosure can be understood as a device with a video coding function, and the decoding device 120 can be understood as a device with a video decoding function. That is, the coding device 110 and the decoding device 120 in this embodiment of the present disclosure include a wider range of devices, including, for example, a smartphone, a desktop computer, a mobile computing device, a notebook computer (e.g. a laptop computer) computer, a tablet computer, a set-top box, a television set, a camera, a display apparatus, a digital media player, a video game console, and a vehicle-mounted computer.

In some embodiments, the coding device 110 may transmit the coded video data (such as the code stream) to the decoding device 120 via a channel 130. The channel 130 may include one or more media and/or apparatuses capable of transmitting the coded video data from the coding device 110 to the decoding device 120.

In one example, the channel 130 includes one or more communication media that enable the coding device 110 to transmit the coded video data directly to the decoding device 120 in real time. In this example, the coding device 110 may modulate the coded video data according to a communication standard, and transmit the modulated video data to the decoding device 120. The communication media include a wireless communication medium, such as a radio frequency spectrum. In some embodiments, the communication media may also include a wired communication medium, such as one or more physical transmission wires.

In another example, the channel 130 includes a storage medium that can store the video data coded by the coding device 110. The storage medium includes a variety of locally accessible data storage media such as an optical disk, a DVD, and a flash memory. In this example, the decoding device 120 may acquire the coded video data from the storage medium.

In another example, the channel 130 may include a storage server that can store the video data coded by the coding device 110. In this example, the decoding device 120 may download the stored coded video data from the storage server. In some embodiments, the storage server may store the coded video data and may transmit the coded video data to the decoding device 120, such as a web server (e.g., for a website) and a file transfer protocol (FTP) server.

In some embodiments, the coding device 110 includes a video coder 112 and an output interface 113. The output interface 113 may include a modulator/demodulator (modem) and/or a transmitter.

In some embodiments, the coding device 110 also includes a video source 111 in addition to the video coder 112 and the input interface 113.

The video source 111 may include at least one of a video acquisition device (such as a video camera), a video archive, a video input interface, and a computer graphics system. The video input interface is used for receiving the video data from a video content provider, and the computer graphics system is configured to generate the video data.

The video coder 112 codes the video data from the video source 111 to generate a code stream. The video data may include one or more pictures or a sequence of pictures. The code stream contains coded information of a picture or a sequence of pictures in the form of a bit stream. The coded information may contain coded picture data and associated data. The associated data can contain a sequence parameter set (SPS), a picture parameter set (PPS) and other syntactic structures. The SPS can contain parameters applied to one or more sequences. The PPS can contain parameters applied to one or more pictures. A syntactic structure refers to a set of zero or more syntactic elements arranged in a specified order in a code stream.

The video coder 112 directly transmits the coded video data to the decoding device 120 via the output interface 113. The coded video data may also be stored on the storage medium or the storage server for subsequent reading by the decoding device 120.

In some embodiments, the decoding device 120 includes an input interface 121 and a video decoder 122.

In some embodiments, the decoding device 120 may also include a display apparatus 123 in addition to the input interface 121 and the video decoder 122.

The input interface 121 includes a receiver and/or a modem. The input interface 121 may receive the coded video data through the channel 130.

The video decoder 122 is configured to decode the coded video data to obtain decoded video data, and transmit the decoded video data to the display apparatus 123.

The display apparatus 123 displays the decoded video data. The display apparatus 123 may be integrated with the decoding device 120 or disposed outside the decoding device 120. The display apparatus 123 may include various display apparatuses, such as a liquid crystal display (LCD), a plasma display, an organic light-emitting diode (OLED) display, or other types of display apparatuses.

In addition, FIG. 1 is only an example. The technical solutions of the embodiments of the present disclosure are not limited to FIG. 1. For example, the technology of the present disclosure may also be applied to single-sided video coding or single-sided video decoding.

A video coding framework provided in the embodiments of the present disclosure is described below.

Figure 2:
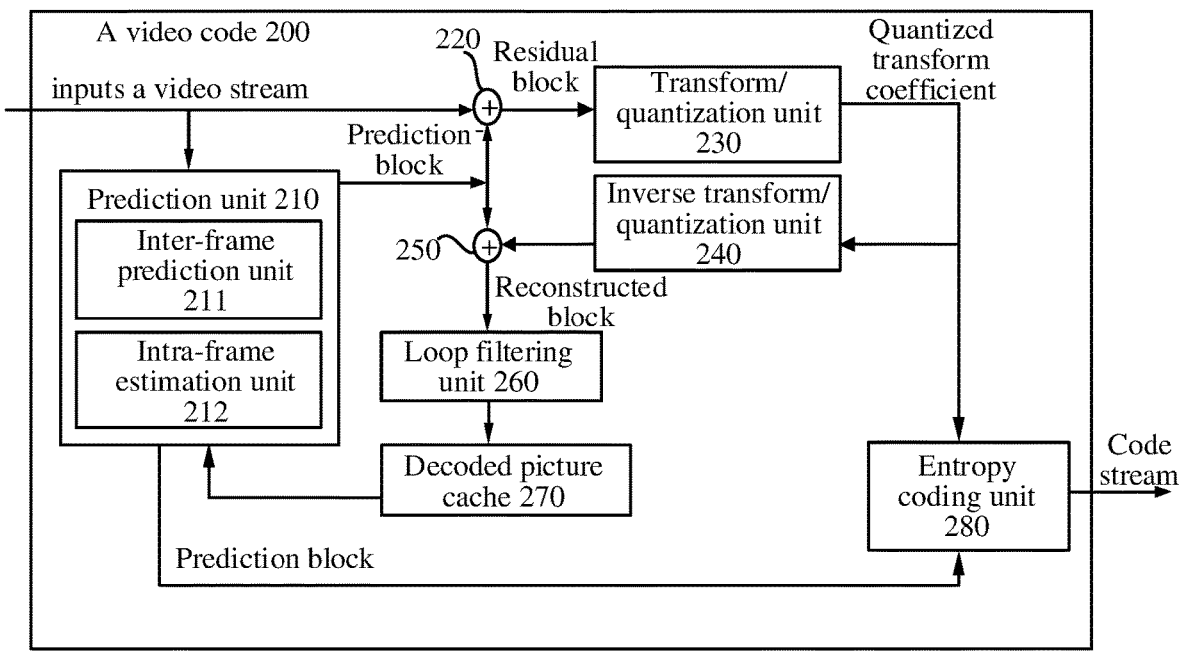
FIG. 2 is a schematic block diagram of a video coder according to an embodiment of the present disclosure.

FIG. 2 is a schematic block diagram of a video coder according to an embodiment of the present disclosure. It is understood that the video coder 200 can be configured to perform lossy compression or lossless compression on pictures. The lossless compression can be either visually lossless compression or mathematically lossless compression.

The video coder 200 can be applied to picture data in a luminance chrominance (YCbCr, YUV) format.

For example, the video coder 200 reads video data and divides a frame of picture into several coding tree units (CTUs) for each frame of picture in the video data. In some examples, CTB can be referred to as "tree block", "largest coding unit" (LCU) or "coding tree block" (CTB). Each CTU can be associated with pixel blocks of equal sizes in the picture. Each pixel can correspond to one luminance (or luma) sampling and two chrominance (or chroma) samplings. Therefore, each CTU may be associated with one luminance sampling block and two chrominance sampling blocks. For example, a size of one CTU is 128×128, 64×64, 32×32 and the like. One CTU can be further divided into several coding units (CUs) for coding. Each CU can be a rectangular or square block. The CUs can be further divided into a prediction unit (PU) and transform unit (TU), which makes coding, prediction and transform separation more flexible. In one example, a CTU is divided into CUs in a quadtree manner, and the CUs are divided into TUs and PUs in a quadtree manner.

The video coder and the video decoder can support various PU sizes. Assuming that a size of a specific CU is 2N×2N, the video coder and the video decoder can support a PU size of 2N×2N or N×N to perform intra-frame prediction, and can support symmetric PUs with sizes of 2N×2N, 2N×N, N×2N, N×N or similar sizes to perform inter-frame prediction. The video coder and the video decoder can also support asymmetric PUs with sizes of 2N×nU, 2N×nD, nL×2N and nR×2N to perform inter-frame prediction.

In some embodiments, as shown in FIG. 2, the video coder 200 may include: a prediction unit 210, a residual unit 220, a transform/quantization unit 230, an inverse transform/quantization unit 240, a reconstruction unit 250, a loop filtering unit 260, a decoded picture cache 270, and an entropy coding unit 280. It is noted that the video coder 200 may include more, fewer or different functional components.

In some embodiments, in the present disclosure, a current block can be referred to as a current coding unit (CU) or a current prediction unit (PU). A prediction block can also be referred to as a prediction picture block or a picture prediction block, and a reconstructed picture block can also be referred to as a reconstructed block or a picture reconstructed picture block.

In some embodiments, the prediction unit 210 includes an inter-frame prediction unit 211 and an intra-frame estimation unit 212. Due to an extremely strong correlation between adjacent pixels in a frame of a video, an intra-frame prediction method is used in a video coding and decoding technology to eliminate a spatial redundancy between the adjacent pixels. Due to an extremely high similarity between adjacent frames in a video, an inter-frame prediction method is used in a video coding and decoding technology to eliminate a temporal redundancy between the adjacent frames, thus improving the coding efficiency.

The inter-frame prediction unit 211 can be configured to perform inter-frame prediction. The inter-frame prediction can refer to picture information of different frames. In the inter-frame prediction, motion information is used to find a reference block from a reference frame, and a prediction block is generated according to the reference block, to eliminate the temporal redundancy. The frames used for the inter-frame prediction can be a P frame and/or a B frame. The P frame refers to a forward prediction frame, and the B frame refers to a bidirectional prediction frame. The motion information includes a reference frame list where the reference frame is located, a reference frame index, and a motion vector. The motion vector can be an entire pixel or a subpixel. If the motion vector is a subpixel, it is necessary to use interpolation filtering in the reference frame to make a block of a desired subpixel. The block of the entire pixel or subpixel in the reference frame found according to the motion vector is referred to as a reference block. In some technologies, a reference block will be directly used as a prediction block. In some other technologies, a prediction block will be processed and generated on the basis of the reference block. Processing and generating a prediction block on the basis of the reference block can also be understood as taking the reference block as a prediction block and then processing the prediction block to generate a new prediction block.

At present, the most commonly used inter-frame prediction methods include: a geometric partitioning mode (GPM) in the VVC standard, and angular weighted prediction (AWP) in the AVS3 standard. The two intra-frame prediction modes have some similarities in principle.

The intra-frame estimation unit 212 only refers to information of the same frame of pictures to predict pixel information in a current code picture block, to eliminate the spatial redundancy. The frames used for intra-frame prediction can be an I frame.

The intra-frame prediction modes used in the HEVC include a total of 35 kinds of prediction modes: Planar, DC and 33 kinds of angle modes. The intra-frame modes used in the VVC include a total of 67 kinds of prediction modes: Planar, DC and 65 kinds of angle modes. The intra-frame modes used in the AVS3 include a total of 66 kinds of prediction modes: DC, Planar, Bilinear and 63 kinds of angle modes.

In some embodiments, the intra-frame estimation unit 212 can be implemented using an intra-frame block replication technology and an intra-frame string replication technology.

The residual unit 220 may generate a residual block of the CU on the basis of a pixel block of the CU and a prediction block of the PU of the CU. For example, the residual unit 220 may generate a residual block of the CU, so that each sampling in the residual block has a value equal to a difference between: sampling in the pixel block of the CU and corresponding sampling in the prediction block of the PU of the CU.

The transform/quantization unit 230 may quantize a transform coefficient. The transform/quantization unit 230 may quantize a transform coefficient associated with the TU of the CU on the basis of a value of a quantization parameter (QP) associated with the CU. The video coder 200 can adjust a quantization degree applied to the transform coefficient associated with the CU by adjusting the value of the QP associated with the CU.

The inverse transform/quantization unit 240 may apply inverse quantization and inverse transform to the quantized transform coefficient respectively to reconstruct the residual block from the quantized transform coefficient.

The reconstruction unit 250 may add the sampling of the reconstructed residual block to the corresponding sampling of one or more prediction blocks generated by the prediction unit 210, to generate a reconstructed picture block associated with the TU. In this way, the sampling block of each TU of the CU is reconstructed, and the video coder 200 can reconstruct the pixel block of the CU.

The loop filtering unit 260 may perform a deblocking filtering operation to reduce a blocking effect of the pixel block associated with the CU.

In some embodiments, the loop filtering unit 260 includes a deblocking filtering unit and sample adaptive offset/adaptive loop filter (SAO/ALF) unit. The deblocking filtering unit is configured to eliminate a blocking effect, and the SAO/ALF unit is configured to eliminate a ringing effect.

The decoded picture cache 270 may store a reconstructed pixel block. The inter-frame prediction unit 211 may use a reference picture that contains the reconstructed pixel block to perform inter-frame prediction on PUs of other pictures. In addition, the intra-frame estimation unit 212 may use the reconstructed pixel block in the decoded picture cache 270 to perform the intra-frame prediction on other PUs in the same picture as the CU.

The entropy coding unit 280 may receive the quantized transform coefficient from the transform/quantization unit 230. The entropy coding unit 280 may perform one or more entropy coding operations on the quantized transform coefficient to generate entropy-coded data.

Figure 3:
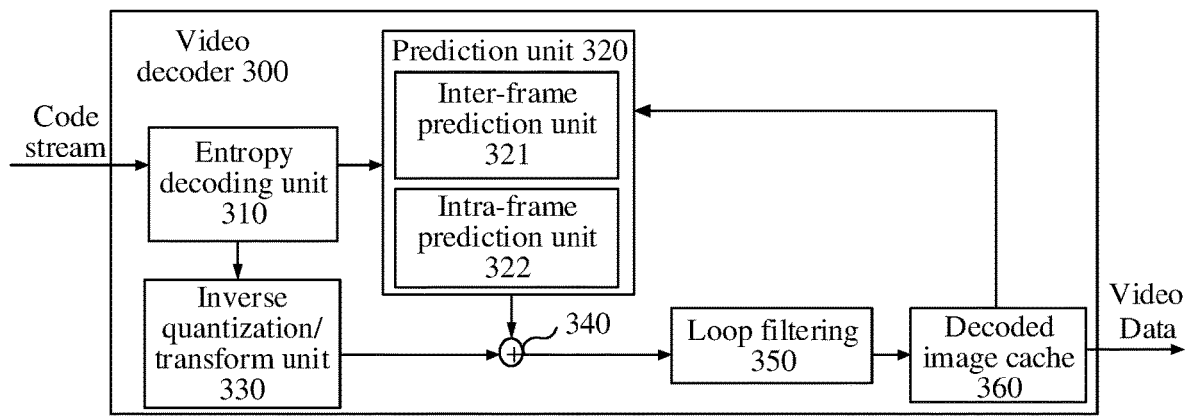
FIG. 3 is a schematic block diagram of a video decoder according to an embodiment of the present disclosure.

FIG. 3 is a schematic block diagram of a video decoder according to an embodiment of the present disclosure.

As shown in FIG. 3, the video decoder 300 includes: an entropy prediction unit 310, a prediction unit 320, an inverse quantization/transform unit 330, a reconstruction unit 340, a loop filtering unit 350 and a decoded picture cache 360. It is noted that the video decoder 300 may include more, fewer or different functional components.

The video decoder 300 may receive a code stream. The entropy decoding unit 310 may parse the code stream to extract syntactic elements from the code stream. As part of parsing the code stream, the entropy decoding unit 310 can parse entropy-coded syntactic elements in the code stream. The prediction unit 320, the inverse quantization/transform unit 330, the reconstruction unit 340, and the loop filtering unit 350 can decode video data according to the syntactic elements extracted from the code stream, that is, generate decoded video data.

In some embodiments, the prediction unit 320 includes an intra-frame prediction unit 321 and an inter-frame prediction unit 322.

The intra-frame prediction unit 321 may perform intra-frame prediction to generate a prediction block of the PU. The intra-frame prediction unit 321 may use an intra-frame prediction mode to generate the prediction block of the PU on the basis of pixel blocks of spatially adjacent PUs. The intra-frame prediction unit 321 may also determine an intra-frame prediction mode of the PU on the basis of the one or more syntactic elements parsed from the code stream.

The inter-frame prediction unit 322 may construct a first reference picture list (list 0) and a second reference picture list (list 1) according to the syntactic elements parsed from the code stream. In addition, if the PU uses inter-frame prediction coding, the entropy decoding unit 310 may parse motion information of the PU. The inter-frame prediction unit 322 may determine one or more reference blocks of the PU according to the motion information of the PU. The inter-frame prediction unit 322 may generate a prediction block of the PU on the basis of the one or more reference blocks of the PU.

The inverse quantization/transform unit 330 reversely quantizes (that is, dequantizes) a transform coefficient associated with the TU. The inverse quantization/conversion unit 330 may a value of a QP associated with the CU of the TU to determine a quantization degree.

After the transform coefficient is inversely quantized, the inverse quantization/transform unit 330 may apply one or more inverse transforms to the inversely quantized transform coefficient, to generate a residual block associated with the TU.

The reconstruction unit 340 uses the residual block associated with the TU of the CU and the prediction block of the PU of the CU to reconstruct the pixel block of the CU. For example, the reconstruction unit 340 may add sampling of the residual block to corresponding sampling of the prediction block to reconstruct the pixel block of the CU, to obtain a reconstructed picture block.

The loop filtering unit 350 may perform a deblocking filtering operation to reduce a blocking effect of the pixel block associated with the CU.

The video decoder 300 may store a reconstructed picture of the CU to the decoded picture cache 360. The video decoder 300 may use the reconstructed picture in the decoded picture cache 360 as a reference picture for subsequent prediction, or transmit the reconstructed picture to a display apparatus for presentation.

A basic flow of video coding and decoding is as follows: At a coder side, a frame of picture is divided into blocks. For a current block, the prediction unit 210 generates a prediction block of the current block using intra-frame prediction or inter-frame prediction. The residual unit 220 may calculate a residual block on the basis of the prediction block and an original block of the current block, that is, a difference value between the prediction block and the original block of the current block. The residual block can also be referred to as residual information. The residual block may remove information that is not sensitive to eyes through processes of transform, quantization and the like by the transform/quantization unit 230, to eliminate a visual redundancy. In some embodiments, the residual block before transform and quantization by the transform/quantization unit 230 may be referred to as a time domain residual block, and the time domain residual block after transform and quantization by the transform/quantization unit 230 may be referred to as a frequency residual block or a frequency domain residual block. The entropy coding unit 280 receives a quantized transform coefficient output by the transform/quantization unit 230, and can perform entropy coding on the quantized transform coefficient, to output a code stream. For example, the entropy coding unit 280 may eliminate a character redundancy according to a target context model and probability information of a binary code stream.

At a decoder side, the entropy decoding unit 310 may parse the code stream to obtain prediction information, a quantization coefficient matrix and the like of the current block, and the prediction unit 320 generates the prediction block of the current block using the intra-frame prediction or inter-frame prediction on the basis of the prediction information. The inverse quantization/transform unit 330 uses the quantization coefficient matrix obtained from the code stream to perform inverse quantization and inverse transform on the quantization coefficient matrix to obtain the residual block. The reconstruction unit 340 adds the prediction block and the residual block to obtain a reconstructed block. The reconstructed block constitutes a reconstructed picture, and the loop filtering unit 350 performs loop filtering on the reconstructed picture on the basis of a picture or a block, to obtain a decoded picture. The coder side also needs to perform the same operations as those performed by the decoder side to obtain a decoded picture. The decoded picture may also be referred to as a reconstructed picture. The reconstructed picture can be used as a reference frame for inter-frame prediction for subsequent frames.

It is noted that block partitioning information is determined by the coder side, and mode information or parameter information such as prediction, transform, quantization, entropy coding and loop filtering are carried in the code stream if necessary. The decoder side determines, by analyzing the code stream and analyzing the existing information, the same block partitioning information and mode information such as prediction, transform, quantization, entropy coding and loop filtering or parameter information as those determined by the coder side, thereby ensuring that the decoded picture obtained by the coder side is the same as the decoded picture obtained by the decoder side.

The above flow is the basic flows of the video coder and the video decoder under a block-based hybrid coding framework. With the development of the technology, some modules or steps of this framework or flow may be optimized. The present disclosure is applicable to the basic flows of the video coder and the video decoder under the block-based hybrid coding framework, but not limited to this framework and flow.

Figure 4:
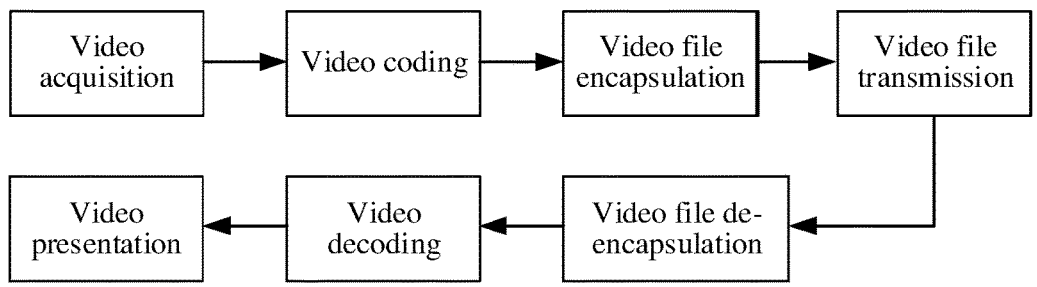
FIG. 4 is a schematic block diagram of a video transmission process according to an embodiment of the present disclosure.

FIG. 4 is a schematic block diagram of a video transmission process according to an embodiment of the present disclosure. As shown in FIG. 4, the video coder shown in FIG. 3 above is used to code an acquired video to obtain the code stream. The code stream is also referred to as a data stream or a bit stream. The code stream obtained by coding is encapsulated to obtain a video file. The video file is sent to the above video decoder. The video decoder de-encapsulates the video file to obtain a video code stream. The video code stream is then decoded to obtain a decoded video. The decoded video is presented, thus achieving transmission and displaying of the video.

In order to facilitate decoding, the code stream includes a sequence header. Contents of the sequence header are shown in Table 1:

TABLE 1

| Definition of the sequence header | Descriptor |
|---|---|
| sequence_header( ) { | |
|   video_sequence_start_code | f(32) |
|   profile_id | u(8) |
|   level_id | u(8) |
|   progressive_sequence | u(1) |
|   field_coded_sequence | u(1) |
|   library_stream_flag | u(1) |
|   if (! LibraryStreamFlag) { | |
|     library_picture_enable_flag | u(1) |
|     if (LibraryPictureEnableFlag) { | |
|       duplicate_sequence_header_flag | u(1) |
|     } | |
|   } | |
|   marker_bit | f(1) |
|   horizontal_size | u(14) |
|   marker_bit | f(1) |
|   vertical_size | u(14) |
|   chroma_format | u(2) |
|   sample_precision | u(3) |
|   if (profile_id == 0x22 \|\| profile_id == 0x32) { | |
|     encoding_precision | u(3) |
|   } | |

TABLE 1-continued

| Definition of the sequence header | Descriptor |
|---|---|
| marker_bit | f(1) |
| aspect_ratio | u(4) |
| frame_rate_code | u(4) |
| marker_bit | f(1) |
| bit_rate_lower | u(18) |
| marker_bit | f(1) |
| bit_rate_upper | u(12) |
| low_delay | u(1) |
| temporal_id_enable_flag | u(1) |
| marker_bit | f(1) |
| bbv_buffer_size | u(18) |
| marker_bit | f(1) |
| max_dpb_minus1 | u(4) |
| rpl1_index_exist_flag | u(1) |
| rpl1_same_as_rp10_flag | u(1) |
| marker_bit | f(1) |
| num_ref_pic_list_set[0] | ue(v) |
| for (j = 0; j < NumRefPicListSet[0]; j++) { | |
|   reference_picture_list_set(0, j) | |
| } | |
| if (! Rpl1SameAsRp10Flag) { | |
|   num_ref_pic_list_set[1] | ue(v) |
|   for (j = 0; j < NumRefPicListSet[1]; j++) { | |
|     reference_picture_list_set(1, j) | |
|   } | |
| } | |
| num_ref_default_active_minus1[0] | ue(v) |
| num_ref_default_active_minus1[1] | ue(v) |
| log2_lcu_size_minus2 | u(3) |
| log2_min_cu_size_minus2 | u(2) |
| log2_max_part_ratio_minus2 | u(2) |
| max_split_times_minus6 | u(3) |
| log2_min_qt_size_minus2 | u(3) |
| log2_max_bt_size_minus2 | u(3) |
| log2_max_eqt_size_minus3 | u(2) |
| marker_bit | f(1) |
| weight_quant_enable_flag | u(1) |
| if (WeightQuantEnableFlag) | |
| { | |
|   load_seq_weight_quant_data_flag | u(1) |
|   if (load_seq_weight_quant_data_flag == '1') { | |
|     weight_quant_matrix( ) | |
|   } | |
| } | |
| st_enable_flag | u(1) |
| sao_enable_flag | u(1) |
| alf_enable_flag | u(1) |
| affine_enable_flag | u(1) |
| smvd_enable_flag | u(1) |
| ipcm_enable_flag | u(1) |
| amvr_enable_flag | u(1) |
| num_of_hmvp_cand | u(4) |
| umve_enable_flag | u(1) |
| if ((NumOfHmvpCand != 0) && AmvrEnableFlag) { | |
|   emvr_enable_flag | u(1) |
| } | |
| intra_pf_enable_flag | u(1) |
| tscpm_enable_flag | u(1) |
| marker_bit | f(1) |
| dt_enable_flag | u(1) |
| if (DtEnableFlag) { | |
|   log2_max_dt_size_minus4 | u(2) |
| } | |
| pbt_enable_flag | u(1) |
| EipmEnableFlag = 0 | |
| MipfEnableFlag = 0 | |
| IntraPfChromaEnableFlag = 0 | |
| UmveEnhancementEnableFlag = 0 | |
| AffineUmveEnableFlag = 0 | |
| SbTmvpEnableFlag = 0 | |
| SrccEnableFlag = 0 | |
| EnhancedStEnableFlag = 0 | |
| EnhancedTscpmEnableFlag = 0 | |
| MaecEnableFlag = 0 | |
| if (profile_id == 0x30 || profile_id == 0x32) { | |
|   EipmEnableFlag = 1 | |
|   pmc_enable_flag | u(1) |
|   if (TscpmEnableFlag) { | |
|     EnhancedTscpmEnableFlag = 1 | |
|   } | |
|   iip_enable_flag | u(1) |
|   sawp_enable_flag | u(1) |
|   MipfEnableFlag = 1 | |
|   if (IntraPfEnableFlag) { | |
|     IntraPfChromaEnableFlag = 1 | |
|   } | |
|   if (UmveEnableFlag) { | |
|     UmveEnhancementEnableFlag = 1 | |
|   } | |
|   if (AffineEnableFlag) { | |
|     AffineUmveEnableFlag = 1 | |
|   } | |
|   if (AffineEnableFlag) { | |
|     asr_enable_flag | u(1) |
|   } | |
|   awp_enable_flag | u(1) |
|   SbTmvpEnableFlag = 1 | |
|   etmvp_mvap_enable_flag | u(1) |
|   dmvr_enable_flag | u(1) |
|   bio_enable_flag | u(1) |
|   bgc_enable_flag | u(1) |
|   inter_pf_enable_flag | u(1) |
|   inter_pc_enable_flag | u(1) |
|   obmc_enable_flag | u(1) |
|   if (StEnableFlag) { | |
|     EnhancedStEnableFlag = 1 | |
|   } | |
|   sbt_enable_flag | u(1) |
|   ist_enable_flag | u(1) |
|   SrccEnableFlag = 1 | |
|   MaecEnableFlag = 1 | |
|   esao_enable_flag | u(1) |
|   ccsao_enable_flag | u(1) |
|   if (EsaoEnableFlag) { | |
|     SaoEnableFlag = 0 | |
|   } | |
|   if (AlfEnableFlag) { | |
|     ealf_enable_flag | u(1) |
|   } | |
|   ibc_enable_flag | u(1) |
|   marker_bit | u(1) |
|   isc_enable_flag | u(1) |
|   if (IbcEnableFlag || IscEnableFlag) { | |
|     num_of_intra_hmvp_cand | u(4) |
|   } | |
|   fimc_enable_flag | u(1) |
|   nn_tools_set_hook | u(8) |
|   if (NnFilterEnableFlag) { | |
|     num_of_nn_filter_minus1 | ue(v) |
|   } | |
|   marker_bit | u(1) |
| } | |
| if (low_delay == '0') | |
|   output_reorder_delay | u(5) |
| cross_patch_loop_filter_enable_flag | u(1) |
| ref_colocated_patch_flag | u(1) |
| stable_patch_flag | u(1) |
| if (stable_patch_flag == '1') { | |
|   uniform_patch_flag | u(1) |
|   if (uniform_patch_flag == '1') { | |
|     marker_bit | f(1) |
|     patch_width_minus1 | ue(v) |
|     patch_height_minus1 | ue(v) |
|   } | |
| } | |
| reserved_bits | r(2) |
| next_start_code( ) | |
| } | |

The semantics of Table 1 above are as follows:

video_sequence_start_code is a start code of a video sequence, such as a bit string '0x000001B0', which identifies the start of the video sequence.

profile_id is a profile identifier, which is an 8-digit unsigned integer, indicating a grade to which a bit stream conforms.

level_id is a level identifier, which is an 8-digit unsigned integer, indicating a level to which a bit stream conforms.

library_stream_flag is a library bit stream flag, which is a binary variable. If a value is '1', it means that a current bit stream is a library bit stream. If a value is '0', it means that a current bit stream is a main bit stream. A value of LibraryStreamFlag is equal to that of library_stream_flag.

library_picture_enable_flag is a library picture enable flag, which is a binary variable. If a value is '1', it means that there can be an inter-frame prediction picture that uses a library picture as a reference picture in the video sequence. If a value is '0', it means that there should be no inter-frame prediction picture that uses a library picture as a reference picture in the video sequence. A value of LibraryPictureEnableFlag is equal to that of library_picture_enable_flag. If no library_picture_enable_flag exists in a bit stream, the value of LibraryPicutreEnableFlag is equal to 0.

duplicate_sequence_header_flag is a library bit stream duplicate sequence header flag, which is a binary variable. If a value is '1', it means that values of all syntactic elements in a sequence header of a current main bit stream other than library_stream_flag, library_picture_enable_flag and duplicate_sequence_header_flag are all the same as values of corresponding syntactic elements in a sequence header of a library bit stream referenced by the current main bit stream. If a value is '0', it means that values of other syntactic elements in a sequence header of a current main bit stream other than library_stream_flag, library_picture_enable_flag and duplicate_sequence_header_flag may be different from values of corresponding syntactic elements in a sequence header of a library bit stream referenced by the current main bit stream.

progressive_sequence is a progressive sequence flag, which is a binary variable. A scanning format of the video sequence is specified. If a value is '1', it means that the coded video sequence contains only progressive frame pictures. If a value is '0', it means that the coded video sequence contains only progressive pictures, or that the coded video sequence contains only interlaced pictures.

If a value of progressive_sequence is '1', an interval between two adjacent display moments is a frame period. If a value of progressive_sequence is '0', an interval between two adjacent display moments is a field period.

field_coded_sequence is a field picture sequence flag, which is a binary variable. If a value is '1', it means that pictures in the coded video sequence are field pictures. If a value is '0', it means that pictures in the coded video sequence are frame pictures. If a value of progressive_sequence is '1', a value of field_coded_sequence is '0'.

horizontal_size is a horizontal size, which is a 14-digit unsigned integer. A width of a displayable region (this region is aligned with a left edge of a picture) of a picture luminance component, that is, a quantity of samples in a horizontal direction, is specified.

Calculations of Picture WidthInMinBu and Picture WidthInMinCu are shown in Table 2:

TABLE 2

PictureWidthInMinBu = (horizontal_size + MiniSize − 1)/MiniSize
PictureWidthInMinCu = (PictureWidthInMinBu * MiniSize + MiniSize − 1)/MinCuSize horizontal_size is not '0'. The unit of horizontal_size is a quantity of samples in each line of a picture. A sample at the upper left corner of the displayable region is aligned with a sample at the upper left corner of the decoded picture.

vertical_size is a vertical size, which is a 14-digit unsigned integer. A width of the displayable region (this region is aligned with a top edge of a picture) of the picture luminance component, that is, a quantity of scanning lines in a vertical direction, is specified.

In the video sequence bit stream, when the values of progressive_sequence and field_coded_sequence are both '0', calculations of PictureHeightInMinBu and PictureHeightInMinCu are as shown in Table 3:

TABLE 3

PictureHeightInMinBu = 2 * ((vertical_size + 2 * MiniSize − 1)/(2 * MiniSize))
PictureHeightInMinCu = 2 * ((PictureHeightInMinBu * MiniSize + 2 * MiniSize − 1)/(2 * MinCuSize))

In other cases, calculations of PictureHeightInMinBu and PictureHeightInMinCu are shown in Table 4:

TABLE 4

PictureHeightInMinBu = (vertical_size + MiniSize − 1)/MiniSize
PictureHeightInMinCu = (vertical_size + MinCuSize − 1)/MinCuSize vertical_size is not 0. The unit of vertical_size is a quantity of lines of a picture sample.

A value of MiniSize is specified by grade.

Figure 5:
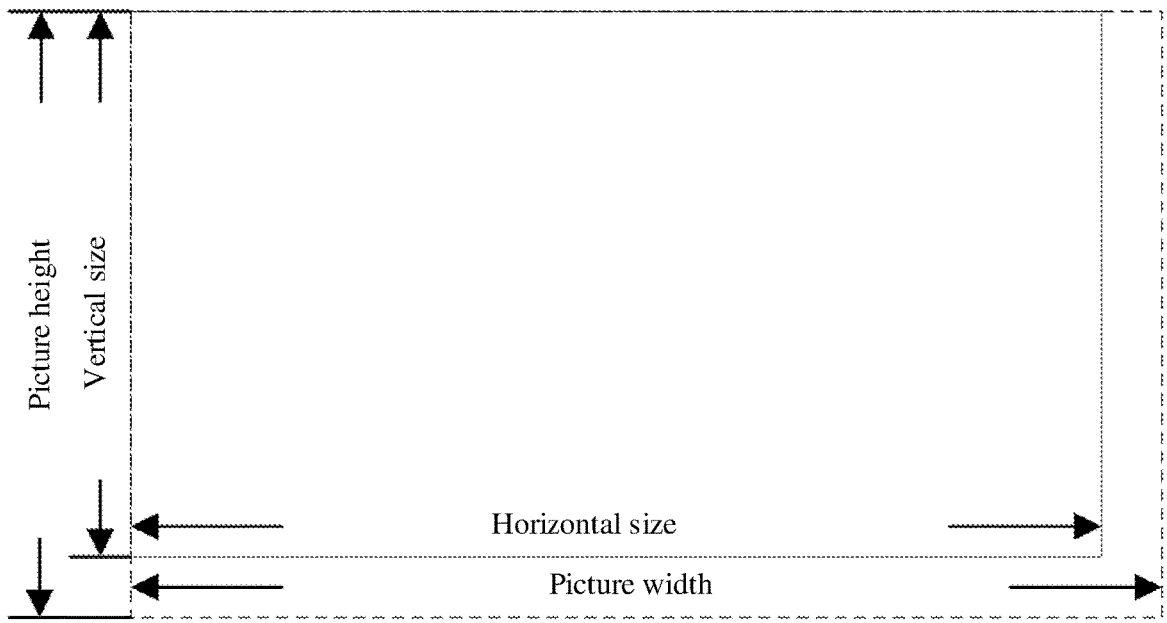
FIG. 5 is a schematic diagram of a picture boundary and a display boundary according to an embodiment of the present disclosure.

Relations between horizontal_size, vertical_size and a picture boundary is shown in FIG. 5. The solid line represents a boundary of the displayable region of the picture, and its width and height are determined by horizontal_size and vertical_size. The dashed line represents a boundary of the picture, and its width and height are determined by Picture WidthInMinBu and PictureHeightInMinBu respectively. A value of PicWidthInLuma is equal to a product of Picture WidthInMinBu multiplied by MiniSize, and a value of PicHeightInLuma is equal to a product of PictureHeightInMinBu multiplied by MiniSize. For example, if the value of horizontal_size is 1920, and the value of vertical_size is 1080, when the values of progressive_sequence and field_coded_sequence are both '0', PictureWidthInMinBu xMiniSize is equal to 1920, and PictureHeightInMinBu×MiniSize is equal to 1088. Otherwise, PictureWidthInMinBu×MiniSize is equal to 1920, and PictureHeightInMinBu×MiniSize is equal to 1080.

chroma_format is a chroma format, which is a 2-digit unsigned integer. The format of a specified chroma component is shown in Table 5:

TABLE 5

Chroma format

| Value of chroma_format | Meaning |
|---|---|
| 00 | Reserved |
| 01 | 4:2:0 |
| 10 | Reserved |
| 11 | Reserved | sample_precision is a sample precision, which is a 3-digit unsigned integer. Precisions of luminance and chroma samples are specified, as shown in Table 6. If a value of sample_precision is '001', a value of SamplePrecision is 8. If a value of sample_precision is '010', a value of SamplePrecision is 10.

TABLE 6

Sample precision

| Value of sample_precision | Meaning |
|---|---|
| 000 | Disable |
| 001 | The luminance and the chroma both have an 8-digit precision. |
| 010 | The luminance and the chroma both have a 10-digit precision. |
| 011-111 | Reserved | encoding_precision is an encoding sample precision, which is a 3-digit unsigned integer. Encoding precisions of luminance and chroma samples are specified, as shown in Table 7. If a value of encoding precision is '001', a value of BitDepth is 8. If a value of encoding precision is '010', a value of BitDepth is 10. If no encoding_precision exists in a bit stream, the value of BitDepth is 8. The value of BitDepth is not less than the value of SamplePrecision.

TABLE 7

Encoding sample precision

| Value of encoding_precision | Meaning |
|---|---|
| 000 | Disable |
| 001 | The luminance and the chroma both have an 8-digit precision. |
| 010 | The luminance and the chroma both have a 10-digit precision. |
| 011-111 | Reserved | aspect_ratio is an aspect ratio, which is a 4-digit unsigned integer. A sample aspect ratio (SAR) or a display aspect ratio (DAR) of the reconstructed picture is specified, as shown in Table 8.

TABLE 8

Aspect ratio

| Value of aspect_ratio | SAR | DAR |
|---|---|---|
| 0000 | Disable | Disable |
| 0001 | 1.0 | — |
| 0010 | — | 4:3 |
| 0011 | — | 16:9 |
| 0100 | — | 2.21:1 |
| 0101-1111 | — | Reserved |

If a bit stream does not contain a sequence display extension, the entire reconstructed picture will be mapped to an entire activity display region. The sample aspect ratio is:

$$SAR = DAR * vertical\_size \div horizontal\_size$$

In this case, horizontal_size and vertical_size are limited by a sample aspect ratio of a source picture and a selected display aspect ratio.

If a bit stream contains a sequence display extension, the sample aspect ratio is:

$$SAR = DAR * display\_vertical\_size \div display\_horizontal\_size$$

frame_rate_code is a frame rate code, which is a 4-digit unsigned integer. A frame rate is specified, as shown in Table 9.

TABLE 9

Frame rate code

| Value of rame_rate_code | Frame rate |
|---|---|
| 0000 | Disable |
| 0001 | 24000 ÷ 1001 (23.976 . . . ) |
| 0010 | 24 |
| 0011 | 25 |
| 0100 | 30000 ÷ 1001 (29.97 . . . ) |
| 0101 | 30 |
| 0110 | 50 |
| 0111 | 60000 ÷ 1001 (59.94 . . . ) |
| 1000 | 60 |
| 1001 | 100 |
| 1010 | 120 |
| 1011 | 200 |
| 1100 | 240 |
| 1101 | 300 |
| 1110 | 120000 ÷ 1001 (119.88 . . . ) |
| 1111 | Reserved |

A time interval between two continuous frames is a reciprocal of the frame rate. A time interval between two fields in interlaced frames is ½ of the reciprocal of the frame rate.

If the value of progressive_sequence is '1', the frame period is equal to the reciprocal of the frame rate.

If the value of progressive_sequence is '0', the field period is equal to ½ of the reciprocal of the frame rate.

bit_rate_lower is a low bit rate, which is lower 18 bits of BitRate.

bit_rate_upper is a high bit rate, which is higher 12 bits of BitRate. BitRate is:

$$BitRate = (bit\_rate\_upper \ll 18) + bit\_rate\_lower$$

BitRate calculates a bit rate of a video bit stream in 400 bit/s and rounds up the bit rate to an integer. BitRate is not 0. For a main bit stream with a value of LibraryPictureEnableFlag of 1, the bit rate of the video bit stream includes a total bit rate of the main bit stream and a referenced library bit stream.

low_delay is a low delay, which is a binary variable. If a value is '1', it means that neither a reference picture queue 0 nor a reference picture queue 1 contains future pictures in a display order, that there is no picture reordering delay, and that a bit stream may contain so-called "large pictures". If a value is '0', it means that the reference picture queue 0 or the reference picture queue 1 contains future pictures in a display order, that there is a picture reordering delay, and that a bit stream does not contain so-called "large pictures".

temporal_id_enable_flag is a temporal sequence identifier enable flag, which is a binary variable. If a value is '1', it means that a video sequence is allowed to use a temporal sequence identifier. If a value is '0', it means that a video sequence does not use a temporal sequence identifier.

bbv_buffer_size is a size of a bit stream buffer region, which is an 18-digit unsigned integer. A size of a bit stream buffer region of a bit stream reference decoder for decoding a video sequence is specified. BBS is a minimum size (in bits) of the bit stream buffer region required by the bit stream reference decoder to decode the video sequence:

$$BBS = 16 * 1024 * bbv\_buffer\_size$$

max_dpb_minus1 is a size of a largest decoded picture buffer region, which is a 4-digit unsigned integer, indicating a size of a largest decoded picture buffer region required for decoding a current bit stream (in a size of a storage buffer region of a single picture). max_dpb_size_minus1 is greater than 0, less than 16 and less than a maximum DPB value corresponding to level_id of the current bit stream. A value of MaxDpbSize is equal to max_dpb_size_minus1 plus 1.

rpl1_index_exist_flag is an index existence flag of the reference picture queue 1, which is a binary variable. If a value is '0', it means that ref_pic_list_set_flag[1] and ref_pic_list_set_index[1] do not appear in a bit stream. If a value is '1', it means that they may appear. A value of Rpl1IndexExistFlag is equal to a value of rpl1_index_exist_flag.

rpl1_same_as_rpl0_flag is a flag indicating that reference picture queues are the same, which is a binary variable. If a value is '0', it means that num_ref_pic_list_set[1] and reference_picture_list_set (1, rplsIndex) appear in a bit stream. If a value is '1', it means that they do not appear. A value of Rpl1SameAsRpl0Flag is equal to that of rpl1_same_as_rpl0_flag.

If the value of rpl1_same_as_rpl0_flag s '1', the value of num_ref_pic_list_set[1] is equal to the value of num_ref_pic_list_set[0], and a value of each syntactic element in a reference picture queue configuration set reference_picture_list_set (1,rplsIndex) is the same as a value of a corresponding syntactic element in a reference picture queue configuration set reference_picture_list_set(0,rplsIndex), where a value range of rplsIndex is 0-(num_ref_pic_list_set [0]-1).

num_ref_pic_list_set[0] and num_ref_pic_list_set[1] are the numbers of reference picture queue configuration sets, indicating quantities of the reference picture queue configuration sets. A value range is 0-64. A value of NumRefPicListSet[0] is equal to that of num_ref_pic_list_set[0]. If the value of Rpl1SameAsRpl0Flag is 1, the value of NumRefPicListSet [1] is equal to that of num_ref_pic_list_set[0]. Otherwise, the value of NumRefPicListSet [1] is equal to that of num_ref_pic_list_Set[1].

num_ref_default_active_minus1[0] and num_ref_default_active_Minus1 [1] are the numbers of default active reference pictures, indicating default maximum values of reference indexes (pu_reference_index_l0, pu_reference_index_l1) in the reference picture queues during decoding of pictures. A value range is 0-14.

log 2_lcu_size_minus2 is a maximum coding unit size, which is a 3-digit unsigned integer, indicating a size of the largest coding unit, with a value range of 3-5. A value of LcuSizeInBit is equal to a value of log 2_lcu_size_minus2 plus 2. A value of MaxQtSize is equal to 2LcuSizeInBit.

log 2_min_cu_size_minus2 is a minimum coding unit size, which is a 2-digit unsigned integer, indicating a size of the smallest coding unit, with a value range of 0-2. Values of MinCuSize, MinBtSize and MinEqtSize are all equal to 2 log 2_min_cu_size_minus2+2.

log 2_max_part_ratio_minus2 is a maximum proportion of a partitioning unit, which is a 2-digit unsigned integer, indicating a ratio of a width to a height or a height to a width of the largest coding unit. A value of MaxPartRatio is equal to 2 log 2_max_part_ratio_minus2+2.

max_split_times_minus6 is a maximum number of times of partitioning of a coding tree, which is a 3-digit unsigned integer, indicating an allowed maximum number of times of splitting of a coding unit. A partitioning depth of a coding unit is increased by 1 at each time a quadtree, a binary tree or an extended quadtree is divided. A value of MaxSplitTimes is equal to a value of max_split_times plus 6.

log 2_min_qt_size_minus2 is a minimum quadtree size, which is a 3-digit unsigned integer, indicating an allowed size of the smallest coding unit for quadtree partitioning, with a value range of 0-5. A value of MinQtSize is equal to 2 log 2_min_qt_size_minus2+2.

log 2_max_bt_size_minus2 is a maximum binary tree size, which is a 3-digit unsigned integer, indicating an allowed size of the largest coding unit for binary tree partitioning, with a value range of 0-5. A value of MaxBtSize is equal to 2 log 2_max_bt_size_minus2+2.

log 2_max_eqt_size_minus3 is a maximum extended quadtree size, which is a 2-digit unsigned integer, indicating an allowed size of the largest coding unit for the extended quadtree, with a value range of 0-3. A value of MaxEqtSize is equal to 2 log 2_max_eqt_size_minus3+3.

weight_quant_enable_flag is a weighted quantization enable flag, which is a binary variable. If a value is '1', it means that weighted quantization is allowed for a video sequence. If a value is '0', it means that no weighted quantization is to be used for a video sequence. A value of WeightQuantEnableFlag is equal to that of weight_quant_enable_flag.

load_seq_weight_quant_data_flag is a weighted quantization matrix loading flag, which is a binary variable. If a value is '1', it means a weighted quantization matrix of 4×4 and 8×8 transform blocks. Loading is performed from the sequence header. If a value is '0', it means a weighted quantization matrix of 4×4 and 8×8 transform blocks. A value of LoadSeqWeightQuantDataFlag is equal to that of load_seq_weight_quant_data_flag. If load_seq_weight_quant_data_flag does not exist in a bit stream, the value of LoadSeqWeightQuantDataFlag is equal to 0.

st_enable_flag is a secondary transform enable flag, which is a binary variable. If a value is '1', it means that secondary transform can be used. If a value is '0', it means that no secondary transform is to be used. A value of StEnableFlag is equal to that of st_enable_flag.

sao_enable_flag is a sample adaptive offset enable flag, which is a binary variable. If a value is '1', it means that sample adaptive offset can be used. If a value is '0', it means that no sample adaptive offset is used. A value of SaoEnableFlag is equal to that of sao_enable_flag.

ccsao_enable_flag is a cross component sample adaptive offset enable flag, which is a binary variable. If a value is '1', it means that cross component sample adaptive offset can be used. If a value is '0', it means that no cross component sample adaptive offset is used. A value of CcsaoEnableFlag is equal to that of cesao_enable_flag. If ccsao_enable_flag does not exist in a bit stream, the value of CcsaoEnableFlag is equal to 0.

alf_enable_flag is an adaptive loop filtering enable flag, which is a binary variable. If a value is '1', it means that adaptive loop filtering can be used. If a value is '0', it means that no adaptive loop filtering is used. A value of AlfEnableFlag is equal to that of alf_enable_flag.

affine_enable_flag is an affine motion compensation enable flag, which is a binary variable. If a value is '1', it means that affine motion compensation can be used. If a value is '0', it means that no affine motion compensation is to be used. A value of AffineEnableFlag is equal to that of affine_enable_flag.

asr_enable_flag is an affine prediction sample refinement enable flag, which is a binary variable. If a value is '1', it means that affine prediction sample refinement can be used. If a value is '0', it means that no affine prediction sample refinement is used. A value of AsrEnableFlag is equal to that of asr_enable_flag. If no asr_enable_flag exists in a bit stream, the value of AsrEnableFlag is 0.

smvd_enable_flag is a symmetric motion vector difference mode enable flag, which is a binary variable. If a value is '1', it means that a symmetric motion vector difference mode can be used. If a value is '0', it means that no symmetric motion vector difference mode is to be used. A value of SmvdEnableFlag is equal to that of smvd_enable_flag.

ipcm_enable_flag is an intra pulse code modulation mode enable flag, which is a binary variable. If a value is '1', it means that an intra pulse code modulation mode can be used. If a value is '0', it means that no intra pulse code modulation mode is to be used. A value of IpcmEnableFlag is equal to that of ipcm_enable_flag.

amvr_enable_flag is an adaptive motion vector resolution enable flag, which is a binary variable. If a value is '1', it means that an adaptive motion vector resolution can be used. If a value is '0', it means that no adaptive motion vector resolution is to be used. A value of AmvrEnableFlag is equal to that of amvr_enable_flag.

num_of_hmvp_cand is the number of pieces of candidate historical motion information of inter-frame prediction, which is a 4-digit unsigned integer. A value of NumOfHmvpCand is equal to that of num_of_hmvp_cand, with a value range of 0-8. If the value of NumOfHmvpCand is 0, it means that no historical motion information is to be used in the inter-frame prediction.

intra_pf_enable_flag is an intra-frame prediction filtering enable flag, which is a binary variable. If a value is '1', it means that intra-frame prediction filtering can be used. If a value is '0', it means that no intra-frame prediction filtering is to be used. A value of IntraPfEnableFlag is equal to that of intra_pf_enable_flag.

umve_enable_flag is an ultimate motion vector expression mode enable flag, which is a binary variable. If a value is '1', it means that an ultimate motion vector expression mode can be used. If a value is '0', it means that not an ultimate motion vector expression mode is to be used. A value of UmveEnableFlag is equal to that of umve_enable_flag.

emvr_enable_flag is a motion vector resolution extension mode enable flag, which is a binary variable. If a value is '1', it means that a motion vector resolution extension mode can be used. If a value is '0', it means that no motion vector resolution extension mode is to be used. A value of EmvrEnableFlag is equal to that of emvr_enable_flag.

tscpm_enable_flag is a two-step cross component prediction mode enable flag, which is a binary variable. If a value is '1', it means that a two-step cross component prediction mode can be used. If a value is '0', it means that no two step cross component prediction mode is to be used. A value of TscpmEnableFlag is equal to that of tscpm_enable_flag.

dt_enable_flag is an intra-frame derived tree mode enable flag, which is a binary variable. If a value is '1', it means that an intra-frame derived tree mode can be used. If a value is 'O', it means that no intra-frame derived tree mode is to be used. A value of DtEnableFlag is equal to that of dt_enable_flag.

log 2_max_dt_size_minus4 is a maximum size of an edge length to be partitioned of intra-frame derived tree mode, which is a 2-digit unsigned integer, indicating an allowed maximum value of the edge length to be partitioned of intra-frame derived tree mode, with a value range of 0-2. A value of DtMaxSize is equal to 2 log 2_max_dt_size_minus4+4. A value of DtMinSize is equal to 16.

pbt_enable_flag is a position-based transform enable flag, which is a binary variable. If a value is '1', it means that position-based transform can be used. If a value is '0', it means that no position-based transform is to be used. A value of PbtEnableFlag is equal to that of pbt_enable_flag.

obmc_enable_flag is an overlapping block motion compensation enable flag, which is a binary variable. If a value is '1', it means that an overlapping block motion compensation mode can be used. If a value is '0', it means that no overlapping block motion compensation mode is to be used. A value of ObmcEnableFlag is equal to that of obmc_enable_flag. If no obmc_enable_flag exists in a bit stream, the value of ObmcEnableFlag is 0.

inter_pf_enable_flag is an inter-frame prediction filtering enable flag, which is a binary variable. If a value is '1', it means that inter-frame prediction filtering can be used. If a value is '0', it means that no inter-frame prediction filtering is to be used. A value of InterPfEnableFlag is equal to that of inter_pf_enable_flag. If no inter_pf_enable_flag exists in a bit stream, the value of InterPfEnableFlag is 0.

inter_pc_enable_flag is an inter-frame prediction correction enable flag, which is a binary variable. If a value is '1', it means that inter-frame prediction correction can be used. If a value is '0', it means that no inter-frame prediction correction is to be used. A value of InterPcEnableFlagis is equal to that of inter_pc_enable_flag. If no inter_pc_enable_flag exists in a bit stream, the value of InterPcEnableFlag is 0.

ist_enable_flag is an implicit selected transform enable flag, which is a binary variable. If a value is '1', it means that implicit selected transform can be used. If a value is '0', it means that no implicit selected transform is to be used. A value of IstEnableFlag is equal to that of ist_enable_flag. If no ist_enable_flag exists in a bit stream, the value of IstEnableFlag is 0.

ibc_enable_flag is an intra block copy prediction enable flag, which is a binary variable. If a value is '1', it means that intra block copy prediction can be used. If a value is '0', it means that no intra block copy prediction is to be used. A value of IbcEnableFlag is equal to that of ibc_enable_flag. If no ibc_enable_flag exists in a bit stream, the value of IbcEnableFlag is 0.

isc_enable_flag is an intra string copy prediction enable flag, which is a binary variable. If a value is '1', it means that intra string copy prediction can be used. If a value is '0', it means that no intra string copy prediction is to be used. A value of IscEnableFlag is equal to that of isc_enable_flag. If no isc_enable_flag exists in a bit stream, the value of IscEnableFlag is 0.

um_of_intra_hmvp_cand is the number of pieces of candidate historical motion information of intra-frame prediction, which is a 4-digit unsigned integer. A value of NumOfIntraHmvpCand is equal to that of um_of_intra_hmvp_cand, with a value range of 0-12. If the value of NumOfIntraHmvpCand is 0, it means that no historical motion information is used in the intra-frame prediction.

fimc_enable_flag is a frequency-based intra mode coding enable flag, which is a binary variable. If a value is '1', it means that frequency-based intra mode coding can be used. If a value is '0', it means that no frequency-based intra mode coding is to be used. A value of FimcEnableFlag is equal to that of fimc_enable_flag. If no fimc_enable_flag exists in a bit stream, the value of FimcEnableFlag is equal to 0.

sbt_enable_flag is a sub-block transform enable flag, which is a binary variable. If a value is '1', it means that sub-block transform can be used. If a value is '0', it means that no sub-block transform is used. A value of SbtEnableFlag is equal to that of sbt_enable_flag. If no sbt_enable_flag exists in a bit stream, the value of SbtEnableFlag is 0.

bio_enable_flag is a bidirectional optical flow enable flag, which is a binary variable. If a value is '1', it means that a bidirectional optical flow can be used. If a value is '0', it means that no bidirectional optical flow is to be used. A value of BioEnableFlag is equal to that of bio_enable_flag. If no bio_enable_flag exists in a bit stream, the value of BioEnableFlag is 0.

dmvr_enable_flag is a decoder side motion vector refinement enable flag, which is a binary variable. If a value is '1', it means that decoder side motion vector refinement can be used. If a value is '0', it means that no decoder side motion vector refinement is to be used. A value of DmvrEnableFlag is equal to that of dmvr_enable_flag. If no dmvr_enable_flag exists in a bit stream, the value of DmvrEnableFlag is 0.

bgc_enable_flag is a bidirectional gradient correction enable flag, which is a binary variable. If a value is '1', it means that bidirectional gradient correction can be used. If a value is '0', it means that no bidirectional gradient correction is to be used. A value of BgcEnableFlag is equal to that of bgc_enable_flag. If no bgc_enable_flag exists in a bit stream, the value of BgcEnableFlag is 0.

enhanced_tscpm_enable_flag is an enhanced two step cross component prediction mode enable flag, which is a binary variable. If a value is '1', it means that an enhanced two step cross component prediction mode can be used. If a value is '0', it means that no enhanced two step cross component prediction mode is to be used. A value of EnhancedTscpmEnableFlag is equal to that of enhanced_tscpm_enable_flag. If no enhanced_tscpm_enable_flag exists in a bit stream, the value of EnhancedTscpmEnableFlag is 0.

pmc_enable_flag is a prediction-with-multicross-component enable flag, which is a binary variable. If a value is '1', it means that prediction-with-multicross-component can be used. If a value is '0', it means that no prediction-with-multicross-component is used. A value of PmcEnableFlag is equal to that of pmc_enable_flag. If no pmc_enable_flag exists in a bit stream, the value of PmcEnableFlag is 0.

iip_enable_flag is an improved intra-frame prediction enable flag, which is a binary variable. If a value is '1', it means that improved intra-frame prediction can be used. If a value is '0', it means that no improved intra-frame prediction is to be used. A value of IipEnableFlag is equal to that of iip_enable_flag. If no iip_enable_flag exists in a bit stream, the value of IipEnableFlag is 0.

sawp_enable_flag is a spatial angular weighted prediction mode enable flag, which is a binary variable. If a value is '1', it means that a spatial angular weighted prediction mode can be used. If a value is '0', it means that no spatial angular weighted prediction mode is to be used. A value of SawpEnableFlag is equal to that of sawp_enable_flag. If no sawp_enable_flag exists in a bit stream, the value of SawpEnableFlag is 0.

awp_enable_flag is an angular weighted prediction mode enable flag, which is a binary variable. If a value is '1', it means that an angular weighted prediction mode can be used. If a value is '0', it means that no angular weighted prediction mode is to be used. A value of AwpEnableFlag is equal to that of awp_enable_flag. If no awp_enable_flag exists in a bit stream, the value of AwpEnableFlag is 0.

esao_enable_flag is an enhanced sample adaptive offset enable flag, which is a binary variable. If a value is '1', it means that enhanced sample adaptive offset can be used. If a value is '0', it means that no enhanced sample adaptive offset is to be used. A value of EsaoEnableFlagis is equal to that of esao_enable_flag. If no esao_enable_flag exists in a bit stream, the value of EsaoEnableFlag is 0. If the value of EsaoEnableFlag is 1, the value of SaoEnableFlag is 0.

etmvp_mvap_enable_flag is an enhanced temporal motion vector prediction and motion vector angle prediction enable flag, which is a binary variable. If a value is '1', it means that enhanced temporal motion vector prediction and motion vector angle prediction can be used. If a value is '0', it means that no enhanced temporal motion vector prediction and motion vector angle prediction is to be used. A value of EtmvpMvapEnableFlag is equal to that of etmvp_mvap_enable_flag. If no etmvp_mvap_enable_flag exists in a bit stream, the value of EtmvpMvapEnableFlag is 0. If the value of EtmvpMvapEnableFlag is 1, the value of NumOfMvapCand is equal to 5. Otherwise, the value of NumOfMvapCand is equal to 0.

calf_enable_flag is an enhanced adaptive loop filtering enable flag, which is a binary variable. If a value is '1', it means that enhanced adaptive loop filtering can be used. If a value is '0', it means that no enhanced adaptive loop filtering is to be used. A value of EalfEnableFlag is equal to that of calf_enable_flag. If no calf_enable_flag exists in a bit stream, the value of EalfEnableFlag is 0.

nn_tools_set_hook is a neural network tool set, which is an 8-digit unsigned integer, to identify whether to use a tool of a neural network. If no nn_tools_set_hook exists in a bit stream, the value of nn_tools_set_hook is '00000000'. These digits need to be ignored during decoding.

If a value of the least significant digit is '1', it means that neural network filtering can be used. If a value of the least significant digit is '0', it means that no neural network filtering is to be used. A value of NnFilterEnableFlag is equal to that of nn_tools_set_hook & 0x01. If no nn_tools_set_hook exists in a bit stream, the value of NnFilterEnableFlag is equal to 0. Other digits are reserved.

num_of_nn_filter_minus1 is the number of neural network filtering models, indicating the number of filtering models available for neural network filtering. A value of NumOfNnFilter is equal to the value of num_of_nn_filter_minus1 plus 1. If no num_of_nn_filter_minus1 exists in a bit stream, the value of NumOfNnFilter is equal to 0. These digits need to be ignored during decoding.

output_reorder_delay is a picture reorder delay, which is a 5-digit unsigned integer. A reorder delay caused by an inconsistency between a picture coding and decoding order and a picture display order is measured in the unit of a decoded picture. Display time of a decoded picture is related to the values of the syntactic elements such as progressive_sequence, progressive_frame, repeat_first_field and picture_structure, so that an absolute length of this period of time is not stationary However, the number of decoded pictures displayed within this period of time is stationary. When a value of low_delay is '0', a value of OutputReorderDelay is equal to that of output_reorder_delay. When a value of low_delay is '1', a value of OutputReorderDelay is 0.

cross_patch_loop_filter_enable_flag is cross patch loop filtering enable flag, which is a binary variable. When a value is '1', it means that deblocking filtering, sample adaptive offset and adaptive loop filtering can be performed by crossing patch boundaries. If a value is '0', it means that deblocking filtering, sample adaptive offset and adaptive loop filtering are not performed by crossing patch boundaries. A value of CplfEnableFlag is equal to that of cross_patch_loop_filter_enable_flag.

stable_patch_flag is a stable patch partitioning flag, which is a binary variable. If a value is '1', it means that manners for partitioning all pictures in a current video sequence into patches are all the same. If a value is '0', it means that manners for partitioning pictures in a current video sequence into patches may be different.

ref_colocated_patch_flag is a flag of a referred colocated patch, which is a binary variable. If a value is '1', it means that only sampling values within boundaries of colocated patches of a reference picture are used for reference during inter-frame prediction. If a value is '0', it means that sampling values beyond boundaries of colocated patches of a reference picture can be used for reference during inter-frame prediction.

uniform_patch_flag is a flag of a uniform patch size, which is a binary variable. If a value is '1', it means that sizes of other patches in a picture other than patches on the rightmost side and the bottommost side are the same. If a value is '0', it means that sizes of patches may be different.

patch_width_minus1 is a width of a patch.

patch_height_minus1 is a height of a patch.

The width and height of the patch have the unit of LCU. A value of patch_width_minus1 is less than 256, and a value of patch_height_minus1 is less than 144. The widths, heights and positions, in the unit of LCU, of various patches of a picture are obtained according to methods in Table 10 below:

TABLE 10

```
tempW = patch_width_minus1 + 1
tempH = patch_height_minus1 + 1
LcuSize = 1 << LcuSizeInBit
PictureWidthInLcu = (horizontal_size + LcuSize −1)/LcuSize
PictureHeightInLcu = (vertical_size + LcuSize −1)/LcuSize
if (tempW> PictureWidthInLcu) {
   tempW = PictureWidthInLcu
}
if (tempH> PictureHeightInLcu){
   tempH = PictureHeightInLcu
}
if (tempW < Min(2, PictureWidthInLcu)) {
   tempW= Min(2, PictureWidthInLcu)
}
numPatchColumns = PictureWidthInLcu / tempW
numPatchRows = PictureHeightInLcu / tempH
for (i = 0; i < numPatchRows; i++) {
   for (j = 0; j < numPatchColumns; j++) {
      PatchSizeInLcu[i][j]->Width = patch_width_minus1 + 1
      PatchSizeInLcu[i][j]->Height= patch_height_minus1 + 1
      PatchSizeInLcu[i][j]->PosX = (patch_width_minus1 + 1) * j
      PatchSizeInLcu[i][j]->PosY= (patch_height_minus1 + 1) * i
   }
}
temp = PictureHeightInLcu % tempH
if (temp != 0) {
   for (j = 0; j < numPatchColumns; j++) {
      PatchSizeInLcu[numPatchRows][j]->Width += tempW
      PatchSizeInLcu[numPatchRows][j]->Height += temp
```

TABLE 10-continued

```
      PatchSizeInLcu[numPatchRows][j]->PosX += tempW * j
      PatchSizeInLcu[numPatchRows][j]->PosY += tempH * numPatchRows
    }
    numPatchRows++
  }
  temp = PictureWidthInLcu % tempW
  if (temp != 0) {
    for (j = 0; j < numPatchRows; j++) {
      PatchSizeInLcu[j][numPatchColums-1]->Width += temp
    }
  }
}
```

A value of MinPatch WidthInPixel is equal to Min(2Lcu-SizeInBit+1, horizontal_size). A width of any patch in the unit of pixels is not less than the value of MinPatch WidthInPixel.

If a value of EipmEnableFlag is 0, it means that no luminance intra-frame prediction extension mode is to be used. If a value is 1, it means that a luminance intra-frame prediction extension mode is to be used.

The value of MipfEnableFlag is 0, which means that no multi-combined intra-frame prediction filtering is to be used. If a value is 1, it means that multi-combined intra-frame prediction filtering is to be used.

A value of IntraPfChromaEnableFlag is 0, which means that no intra-frame chroma prediction filtering is used. A value is 1, which means that intra-frame chroma prediction filtering is to be used.

A value of UmveEnhancementEnableFlag is 0, which means that no ultimate motion vector expression enhancement mode is to be used. A value is 1, which means that an ultimate motion vector expression enhancement mode is to be used.

A value of affineUmveEnableFlag is 0, which means that no affine ultimate motion vector expression mode is to be used. A value is 1, which means that an affine ultimate motion vector expression mode can be used.

A value of SbTmvpEnableFlag is 0, which means that no sub-block temporal motion information prediction is to be used. A value is 1, which means that sub-block temporal motion information prediction is to be used.

The value of SrccEnableFlag is 0, which means that no scanning region-based coefficient coding is to be used. A value is 1, which means that scanning region-based coefficient coding is to be used.

A value of MaecEnableFlag is 0, which means that no multi-hypothesis probability model advanced entropy coding is to be used. A value is 1, which means that multi-hypothesis probability model advanced entropy coding is to be used.

The value of EnhancedStEnableFlag is 0, which means that no enhanced secondary transform is to be used. A value is 1, which means that enhanced secondary transform is to be used.

A value of EnhancedTscpmEnableFlag is 0, which means that no enhanced two step cross component prediction mode is to be used. A value is 1, which means that an enhanced two step cross component prediction mode is to be used.

In some embodiments, the media file further includes a decoder configuration record. The decoder configuration record is used for defining a decoder configuration record of a video, including the following contents:

```
Grammar
  class Avs3DecoderConfigurationRecord{
    unsigned int(8) configuration Version;
    unsigned int(8) profile_id;
    unsigned int(8) level_id;
    bit(6) reserved = '111111'b;
    unsigned int(2) chroma_format;
    bit(5) reserved = '11111'b;
    unsigned int(3) sample_precision;
    bit(4) reserved = '1111'b;
    unsigned int(4) frame_rate_code;
    bit(6) reserved = '111111'b;
    unsigned int(2) library_dependency;
    bit(5) reserved = '11111'b;
    unsigned int(3) temporal_layer_num;
  }
Semantics
```

Semantics configuration Version indicates a version of a current decoder configuration record. When the decoder cannot recognize a current version number, the decoder will not decode a video coding bit stream contained in the track.

profile_id contains a matching value of a profile_id field defined in the AVS3 video standard, indicating grade information of an AVS3 video coding bit stream applicable to the current decoder configuration record.

level_id contains a matching value of a level_id field defined in the AVS3 video standard, indicating level information of an AVS3 video coding bit stream applicable to the current decoder configuration record.

chroma_format contains a matching value of a chroma_format field defined in the AVS3 video standard, indicating a chroma format of an AVS3 video coding bit stream applicable to the current decoder configuration record.

sample_precision contains a matching value of a sample_precision field defined in the AVS3 video standard, indicating sample precision of an AVS3 video coding bit stream applicable to the current decoder configuration record.

frame_rate_code contains a matching value of a frame_rate_code field defined in the AVS3 video standard, indicating a frame rate code of an AVS3 video coding bit stream applicable to the current decoder configuration record.

library_dependency indicates a dependency relation between a track applicable to the current decoder configuration record and a library bit stream track, as shown in Table 11.

TABLE 11

Library bit stream dependency

| Value of library_dependency | Meaning |
|---|---|
| 00 | The track applicable to the current decoder configuration record is a master bit stream track, and this track does not depend on the library bit stream track |
| 01 | The track applicable to the current decoder configuration record is a master bit stream track, and this track depends on the library bit stream track |
| 10 | The track applicable to the current decoder configuration record is the library bit stream track | temporal_layer_num indicates the maximum number of temporal layers in a video code stream corresponding to the track. A value of this field is 1 to 7.

In some embodiments, the media file further includes a sample group that depends on a library sample. The sample group that depends on a library sample is used for providing, for samples in the group, position information of library layer samples on which the samples depend, including the following contents:

Grammar
class LibrarySampleGroupEntry extend VisualSampleGroupEntry ('libg'){
   unsigned int (32) library_track_ID;
   unsigned int (32) library_sample_index;
}
Semantics Semantics
   library_track_ID indicates a serial number of a track where a sample entry of a referenced sample pointed by this group is located.
   library_sample_index indicates a serial number of a sample entry of a referenced sample pointed by this group.

It can be seen from the above that the parameters in the sequence header are used for describing sequence characteristics and parameters related to sequence decoding. In some cases, a bit stream contains a plurality of sequence headers, and the plurality of sequence headers may be located at different positions of the bit stream. In a current encapsulation technology, the plurality of sequence headers are not processed, resulting in a problem of low efficiency. For example, when the video bit stream includes a plurality of duplicate sequence headers, the decoder side has a problem of repeatedly decoding the sequence headers. For another example, when the video bit stream includes a plurality of different sequence headers, if the decoder side has decoded a front-end bit stream and finds that the parameters of the decoder cannot be used to decode a back-end bit stream, a problem of invalid decoding will be caused.

In order to solve the above technical problems, the file encapsulation device of the present disclosure determines sequence header information corresponding to the video bit stream according to at least one sequence header included in the video bit stream, and the sequence header information is contained in a video track that encapsulates the video bit stream. In this way, the file de-encapsulation device can decode the video bit stream according to the sequence header information in the video track. For example, when the video bit stream includes a plurality of duplicate sequence headers, one sequence header can be decoded to decode subsequent video bit streams, thus avoiding a problem of repeatedly decoding sequence headers. For another example, when the video bit stream includes a plurality of different sequence headers, the file de-encapsulation device determines, according to the plurality of different sequence headers before decoding the video bit stream, whether a decoder has an ability of decoding the video bit stream corresponding to the plurality of different sequence headers, thereby avoiding a problem that some video bit streams cannot be decoded after some video bit streams are decoded, and improving the video decoding efficiency.

The technical solution of the embodiments of the present disclosure is described in detail below. The following several embodiments may be mutually combined, and same or similar concepts or processes may not be repeatedly described in some embodiments.

Figure 6:
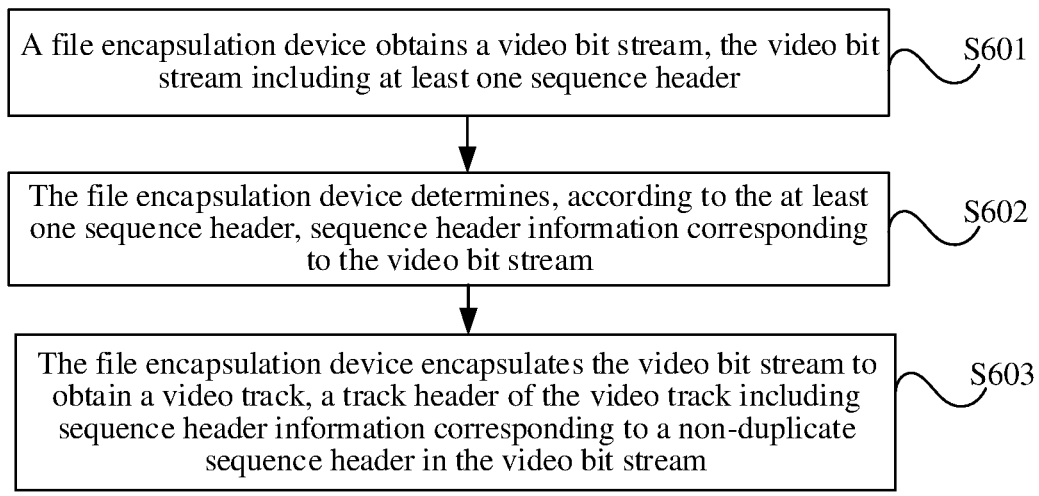
FIG. 6 is a flow diagram of a media file encapsulation method according to an embodiment of the present disclosure.

FIG. 6 is a flow diagram of a media file encapsulation method according to an embodiment of the present disclosure. As shown in FIG. 6, the method includes the following steps:

S601. A file encapsulation device obtains a video bit stream, the video bit stream including at least one sequence header.

In some embodiments, the file encapsulation device is also referred to as a video encapsulation device, or a video coding device.

In some embodiments, the video bit stream is also referred to as a video code stream or the like.

In this embodiment of the present disclosure, manners used by the file encapsulation device to obtain a video bit stream include but are not limited to the following several manners:

Manner I: The file encapsulation device obtains a video bit stream after video coding from other devices.

For example, the file encapsulation device obtains the video bit stream after video coding from a storage device, or obtains the video bit stream after video coding from other coding devices.

In some embodiments, the above video bit stream is one or more groups of video bit streams.

Manner II: The file encapsulation device encodes the video to obtain the encoded bit stream. For example, the file encapsulation device is a coding device. After obtaining a video from an acquisition device (such as a camera), the file encapsulation device codes the video to obtain a bit stream after video coding.

S602. The file encapsulation device determines, according to the at least one sequence header, sequence header information corresponding to the video bit stream.

In some embodiments, the sequence header information includes the number of non-duplicate sequence headers or the number of duplicate sequence headers.

In some embodiments, the sequence header information includes at least one of a length of the sequence header, an identifier of the sequence header, syntactic element information of the sequence header, and a coded flag corresponding to the video bit stream.

The number of the non-duplicate sequence headers can be understood as the number of non-duplicate sequence headers among the plurality of sequence headers included in the video bit stream. That is, when the plurality of sequence headers included in the video bit stream are counted, the same sequence header is only counted once, thus obtaining the number of the sequence headers.

In some embodiments, the number of the non-duplicate sequence headers can be represented using sequence_header_num.

A length of a sequence header can be understood as a length of each of the non-duplicate sequence headers.

In some embodiments, the length of the sequence header can be represented using sequence_header_length.

In some embodiments, the length of the sequence header is in bytes.

An identifier of a sequence header can be understood as an identifier of each of the non-duplicate sequence headers.

In some embodiments, the identifier of the sequence header can be represented using sequence_header_id.

Syntactic element information of a sequence header can be understood as syntactic element of each of the non-duplicate sequence headers.

In some embodiments, the contents included in the syntactic element information of the sequence header are shown in Table 1 above.

In some embodiments, the syntactic element information of the sequence header can be represented using sequence_header.

A coded flag corresponding to the video bit stream indicates a coding scanning manner used when the video bit stream is coded.

In some embodiments, the coding scanning manner includes a progressive scanning-based frame coding manner and an interlaced scanning-based field coding manner.

In some embodiments, a coded flag corresponding to the video bit stream is represented using general_field_coded_flag.

For example, if a value of general_field_coded_flag is 1, it means that the video bit stream is a progressive scanning-based frame-coded code stream. If a value of general_field_coded_flag is 2, it means that the video bit stream is an interlaced scanning-based field-coded code stream.

The present disclosure does not limit specific values of values 1 and 2 above. For example, the value 1 is 0, and the value 2 is 1.

In some embodiments, if the video bit stream includes a plurality of duplicate sequence headers, the plurality of duplicate sequence headers can be regarded as one sequence header. At this time, the number of the non-duplicate sequence header included in the sequence header information corresponding to the video bit stream is 1; the length of the sequence header is a length of the duplicate sequence header; the identifier of the sequence header is an identifier of the duplicate sequence header; and the syntactic element information of the sequence header is syntactic element information of the duplicate sequence header. That is, if the video bit stream includes a plurality of duplicate sequence headers, the sequence header information includes relevant information of one of the plurality of duplicate sequence headers.

In some embodiments, when the video bit stream includes a main bit stream and a library bit stream, and values of all syntactic elements in a sequence header of the main bit stream other than a library bit stream flag, a library picture enable flag and a library bit stream duplicate sequence header flag are all the same as values of corresponding syntactic elements in a sequence header of a library bit stream referenced by the main bit stream, the sequence header of the main bit stream and the sequence header of the library bit stream are understood as two duplicate sequence headers, and at this time, it is determined that the number of the non-duplicate sequence header is 1 and that the non-duplicate sequence header is the sequence header of the library bit stream.

In some embodiments, when the video bit stream includes a plurality of different sequence headers, the sequence header information corresponding to the video bit stream can be determined according to the plurality of different sequence headers.

In some embodiments, the sequence header information further includes at least one of a profile identifier, a level identifier, a chroma format, a sample precision, and a frame rate code.

The profile identifier indicates grade information of a video coding bit stream applicable to a current decoder configuration record.

For example, the grade information of the video coding bit stream can be represented using general_profile_id.

In some embodiments, the general_profile_id contains a matching value of the profile_id field defined in the AVS3 video standard.

In some embodiments, if the number N of the sequence headers is greater than 1, it is determined that a value of the profile identifier field is a maximum value among values of the profile identifier fields in the N sequence headers. For example, when the value of sequence_header_num is greater than 1, the value of this field is the maximum value among values of the profile_id fields in the N sequence_headers.

The level identifier indicates level information of the video coding bit stream applicable to the current decoder configuration record.

For example, the level information of the video coding bit stream can be represented using general_level_id.

In some embodiments, the general_level_id contains a matching value of the level_id field defined in the AVS3 video standard.

In some embodiments, if the number N of the non-duplicate sequence headers is greater than 1, it is determined that a value of the level identifier field is a maximum value among values of the level identifier fields in the N sequence headers. For example, when the value of sequence_header_num is greater than 1, the value of this field is the maximum value among values of the level_id fields in the N sequence_headers.

The chroma format indicates a chroma format of the video coding bit stream applicable to the current decoder configuration record.

For example, the chroma format of the video coding bit stream can be represented using general_chroma_format.

In some embodiments, the general_chroma_format contains a matching value of the chrome_format field defined in the AVS3 video standard.

In some embodiments, if the number N of the non-duplicate sequence headers is greater than 1, it is determined that values of the chroma format fields in the N sequence headers are the same. For example, when the value of sequence_header_num is greater than 1, the values of the chroma format fields in the N sequence_headers need to be the same.

The sample precision indicates a sample precision of the video coding bit stream applicable to the current decoder configuration record.

For example, the sample precision of the video coding bit stream can be represented using general_sample_precision.

In some embodiments, the general_sample_precision contains a matching value of the sample_precision field defined in the AVS3 video standard.

In some embodiments, if the number N of the non-duplicate sequence headers is greater than 1, it is determined that a value of the sample precision field is a maximum value among values of the sample precision fields in the N sequence headers. For example, when the value of sequence_header_num is greater than 1, the value of this field is the maximum value among values of the sample_precision fields in the N sequence_headers.

The frame rate code indicates a frame rate code of the video coding bit stream applicable to the current decoder configuration record.

For example, the frame rate code of the video coding bit stream can be represented using general_frame_rate_code.

In some embodiments, the general_frame_rate_code contains a matching value of the frame_rate_code field defined in the AVS3 video standard.

In some embodiments, if the number N of the non-duplicate sequence headers is greater than 1, a value of the frame rate code field is determined based on frame rate information of all sample sets in the video track. For example, when the value of sequence_header_num is greater than 1, the value of this field means the frame rate information of all the sample sets in the corresponding track.

It is noted that the sequence header information of this embodiment of the present disclosure includes, but is not limited to, the above information. It can also include less information than the above information, or more information than the above information. This embodiment of the present disclosure does not limit this, which is determined according to actual needs.

S603. The file encapsulation device encapsulates the video bit stream to obtain a video track, the video track including the sequence header information corresponding to the video bit stream.

In some embodiments, if the sequence header information includes the syntactic element information of the sequence header, the video bit stream encapsulated by the file encapsulation device may not include the syntactic element information of the sequence header. This can reduce a data volume in the video bit stream and improve the video bit stream encapsulation efficiency.

This embodiment of the present disclosure does not limit a specific placement position of the sequence header information in the video track. For example, the sequence header information can be placed at any position of the video track.

In some embodiments, in order to facilitate parsing of the sequence header information, the sequence header information corresponding to the video bit stream is placed at a head of the video track.

In some embodiments, the sequence header information is placed in current decoder configuration record information.

In some embodiments, the current decoder configuration recording information is located at the head of the video track.

It can be seen from the above that the current decoder configuration record information includes a profile identifier, a level identifier, a chroma format, a sample precision, a frame rate code, or other information. In some embodiments, if the sequence header information includes at least one of a profile identifier, a level identifier, a chroma format, a sample precision, and a frame rate code, the profile identifier, the level identifier, the chroma format, the sample precision or the frame rate code multiplexes the profile identifier, the level identifier, the chroma format, the sample precision or the frame rate code in the current decoder configuration record information.

In some embodiments, if the encapsulation standard of the above media file is ISOBMFF, the current decoder configuration record information of this embodiment of the present disclosure is located in an ISOBMFF data box.

If the sequence header information is located in the current decoder configuration record information, after the current decoder configuration record information is extended, the current decoder configuration record information includes the following contents:

```
class Avs3DecoderConfigurationRecord{
  unsigned int(8) configuration Version;
  unsigned int(8) general_profile_id;
  unsigned int(8) general_level_id;
  bit(6) reserved = '111111'b;
  unsigned int(2) general_chroma_format;
  bit(5) reserved = '11111'b;
  unsigned int(3) general_sample_precision;
  bit(4) reserved = '1111'b;
  unsigned int(4) general_frame_rate_code;
  bit(6) reserved = '111111'b;
  unsigned int(2) library_dependency;
  bit(4) reserved = '1111'b;
  unsigned int(3) temporal_layer_num;
  unsigned int(1) general_field_coded_flag;
  unsigned int(8) sequence_header_num;
  for(int i=0; i<sequence_header_num; i++){
    unsigned int(16) sequence_header_length;
    bit(8*sequence_header_length) sequence_header;
    if(sequence_header_num > 1){
      unsigned int(8) sequence_header_id;
    }
  }
}
``` configuration Version indicates a version of a current decoder configuration record. When the decoder cannot recognize a current version number, the decoder will not decode a video coding bit stream contained in the track.

general_profile_id contains a matching value of a profile_id field defined in the AVS3 video standard, indicating grade information of an AVS3 video coding bit stream applicable to the current decoder configuration record. When the value of sequence_header_num is greater than 1, the value of this field is a maximum value among values of the profile_id fields in the N sequence_headers.

general_level_id contains a matching value of a level_id field defined in the AVS3 video standard, indicating level information of an AVS3 video coding bit stream applicable to the current decoder configuration record. When the value of sequence_header_num is greater than 1, the value of this field is a maximum value among values of the level_id fields in the N sequence_headers.

general_chroma_format contains a matching value of a chroma_format field defined in the AVS3 video standard, indicating a chroma format of an AVS3 video coding bit stream applicable to the current decoder configuration record. When the value of sequence_header_num is greater than 1, values of the fields in the N sequence_headers need to be the same.

general_sample_precision contains a matching value of a sample_precision field defined in the AVS3 video standard, indicating sample precision of an AVS3 video coding bit stream applicable to the current decoder configuration record. When the value of sequence_header_num is greater than 1, the value of this field is a maximum value among values of the sample_precision fields in the N sequence_headers.

general_frame_rate_code contains a matching value of a frame_rate_code field defined in the AVS3 video standard, indicating a frame rate code of an AVS3 video coding bit stream applicable to the current decoder configuration record. When the value of sequence_header_num is greater than 1, the value of this field means frame rate information of all sample sets in the corresponding track.

library_dependency indicates a dependency relation between a track applicable to the current decoder configuration record and a library bit stream track, as shown in Table 12.

TABLE 12

Library bit stream dependency

| Value of library_dependency | Meaning |
| --- | --- |
| 00 | The track applicable to the current decoder configuration record is a master bit stream track, and this track does not depend on the library bit stream track |
| 01 | The track applicable to the current decoder configuration record is a master bit stream track, and this track depends on the library bit stream track |
| 10 | The track applicable to the current decoder configuration record is the library bit stream track |
| 11 | The track applicable to the current decoder configuration record contains both the main bit stream and the library bit stream. | temporal_layer_num indicates the maximum number of temporal layers in a video bit stream corresponding to the track. A value of this field is 1 to 7.

A value of general_field_coded_flag is 0, which means that the video bit stream corresponding to the track is a progressive scanning-based frame-coded code stream. A value is 1, which means that the video bit stream corresponding to the track is an interlaced scanning-based field-coded code stream.

sequence_header_Num indicates the number of non-duplicate sequence headers contained in the video bit stream corresponding to the track. When a value of library_dependency is 11, and a value of the duplicate_sequence_header_flag field in the sequence header of the main bit stream is 1, the value of sequence_header_num is 1, and the sequence header contained in the current decoder configuration record is a sequence header of a library picture bit stream.

sequence_header_length indicates a length of a corresponding sequence header, in bytes.

sequence_header indicates sequence_header information of a referenced video bit stream.

sequence_header_id indicates an identifier of a corresponding sequence header.

In this embodiment of the present disclosure, since the sequence header information corresponding to the video bit stream is included in the video track, after obtaining the video track, the file de-encapsulation device parses the sequence header information in the video track, and decodes the video bit stream according to the sequence header information, so that the video bit stream decoding efficiency can be improved. For example, when the video bit stream includes a plurality of duplicate sequence headers, one sequence header can be decoded to decode subsequent video bit streams, thus avoiding a problem of repeatedly decoding sequence headers. For another example, when the video bit stream includes a plurality of different sequence headers, the file de-encapsulation device determines, according to the plurality of different sequence headers before decoding the video bit stream, whether a decoder has an ability of decoding the video bit stream corresponding to the plurality of different sequence headers, thereby avoiding a problem that some video bit streams cannot be decoded after some video bit streams are decoded, and improving the video decoding efficiency.

In some embodiments, the video track further includes reference relation information when the number N of the non-duplicate sequence header is greater than 1. The reference relation information indicates a sample for reference to each sequence header.

In this embodiment of the present disclosure, when the video bit stream includes N non-duplicate sequence headers, each of the N non-duplicate sequence headers corresponds to a partial bit stream, for example, sequence header 1 corresponds to a bit stream of 1 to 100 frames of pictures, and sequence header 2 corresponds to a bit stream of 101 to 200 frames of pictures. When the bit stream of the 1 to 100 frames of pictures is decoded, it is necessary to refer to the syntactic element information of sequence header 1. When the bit stream of the 101 to 200 frames of pictures is decoded, it is necessary to refer to the syntactic element information of sequence header 2. Based on this, in order to facilitate the decoding in this embodiment of the present disclosure, if the number N of the non-duplicate sequence headers is greater than 1, the video track also includes reference relation information for indicating a sample for reference to each sequence header.

In some embodiments, the reference relation information includes an index range of the sample for reference to each sequence header. For example, the bit stream of the 1 to 100 frames of pictures is packed in samples with index numbers of 1 to 100. The samples 1 to 100 refer to sequence header 1 during decoding. Therefore, the reference relation information includes an index range of 1 to 100 of the samples for reference to sequence header 1. The bit stream of the 101 to 200 frames of pictures is packed in samples with index numbers of 101 to 200. The samples 101 to 200 refer to sequence header 2 during decoding. Therefore, the reference relation information further includes an index range of 101 to 200 of the samples for reference to sequence header 2.

In some embodiments, sample_index_min and sample_index_max are used to represent an index range of samples for reference to a certain sequence header, where sample_index_min represents a minimum value of the index range of the samples for reference to the sequence header, and sample_index_max represents a maximum value of the index range of the samples for reference to the sequence header.

This embodiment of the present disclosure does not limit a specific placement position of the above reference relation information in the video track.

In some embodiments, in order to facilitate the decoding, the above reference relation information is placed at the head of the video track.

In some embodiments, the above reference relation information is placed in sequence header-dependent sample group information.

In some embodiments, the above dependent sample group information is located at the head of the video track.

If the above reference relation information is placed in the dependent sample group information, the dependent sample group information needs to be extended.

In one example, extended dependent sample group information includes the following contents:

```
Grammar
class SequenceHeaderDependencySampleGroupEntry extend
VisualSampleGroupEntry ('a3sg'){
unsigned int(8) sequence_header_id;
{
Semantics
```

Semantics sequence_header_id indicates an identifier of a sequence header referenced by samples in the group.

In some embodiments, a reference relation between a sequence header and samples can also be indicated by indicating a range of serial numbers of the samples corresponding to the sequence header.

```
class Avs3DecoderConfigurationRecord{
   ...
   unsigned int(8) sequence_header_num;
   for(int i=0; i<sequence_header_num; i++){
      unsigned int(16) sequence_header_length;
      bit(8*sequence_header_length) sequence_header;
      if(sequence_header_num > 1){
         unsigned int(8) sequence_header_id;
         unsigned int(32) sample_index_min;
         unsigned int(32) sample_index_max;
      }
   }
}
``` sample_index_min and sample_index_max separately indicate a minimum value and a maximum value of the index range of the samples for reference to the sequence header.

In some embodiments, when the video track includes a main bit stream sample and a library picture sample, the video track further includes sample distinguishing information used for distinguishing the main bit stream sample from the library picture sample.

In this embodiment of the present disclosure, the sequence headers referenced during decoding of the main bit stream sample and the library picture sample may be different, or decoding of the main bit stream sample needs to refer to the library picture sample, so that in order to facilitate accurate decoding of the main bit stream sample and the library picture sample separately, the main bit stream sample and the library picture sample in the video track need to be distinguished accurately. Based on this, the sample distinguishing information used for distinguishing the main bit stream sample from the library picture sample is added in the video track in this embodiment of the present disclosure.

In some embodiments, the sample distinguishing information includes an index range of any one of the main bit stream sample and the library picture sample.

In some embodiments, the sample distinguishing information includes an index range of the library picture sample in the video track.

In some embodiments, library_sample_index_min and library_sample_index_max can be used to represent the index range of the library picture sample. library_sample_index_min represents a minimum index number in the index range of the library picture sample, and library_sample_index_max represents a maximum index number in the index range of the library picture sample.

This embodiment of the present disclosure does not limit a specific placement position of the above sample distinguishing information in the video track.

In some embodiments, in order to facilitate the decoding, the above sample distinguishing information is placed at the head of the video track.

In some embodiments, the above sample distinguishing information is placed in library picture sample group information.

In some embodiments, the above library picture sample group information is located at the head of the video track.

If the above sample distinguishing information is placed in the library picture sample group information, the library picture sample group information needs to be extended.

In one example, extended library picture sample group information includes the following:

```
Grammar
class LibrarySampleGroupEntry extend
Visual SampleGroupEntry ('a3lg'){
}
```

In some embodiments, the library picture sample can also be identified by indicating a range of serial numbers of samples corresponding to the library picture sample.

```
class Avs3SampleEntry( ) extends VisualSampleEntry ('av3e'){
   Avs3ConfigurationBox config;
   MPEG4ExtensionDescriptorsBox ( ); // optional
   if(library_dependency == 11){
      unsigned int(32) library_sample_index_min;
      unsigned int(32) library_sample_index_max;
   }
}
``` library_sample_index_min and library_sample_index_max separately indicate a minimum value and a maximum value of the index range of the library picture sample.

In some embodiments, when at least one sample in the video track depends on a library picture sample during coding, the video track further includes library sample-dependent information. The library sample-dependent information indicates information of a track with the library picture sample on which the at least one sample depends.

The library sample-dependent information includes library picture track indication information, and the library picture track indication information indicates whether the library picture sample, on which the at least one sample depends, is located in the video track.

In some embodiments, it is indicated, when a value of the library picture track indication information is a first value, that the library picture sample, on which the at least one sample depends, is located in the video track. At this time, it is not necessary for the file encapsulation device to indicate the identifier of the track where the library picture sample, on which the at least one sample depends, is located, and the identifier of the library picture sample in the track, thus reducing a data volume for transmission.

In some embodiments, the library sample-dependent information further includes a library picture track identifier when a value of the library picture track indication information is a second value, and the library picture track identifier indicates an identifier of a track with the library picture sample on which the at least one sample depends.

The present disclosure does not limit specific values of the first value and the second value.

In some embodiments, the first value is 1.

In some embodiments, the second value is 0.

In some embodiments, default_library_track is used to represent the library sample-dependent information.

This embodiment of the present disclosure does not limit a specific placement position of the above library sample-dependent information in the video track.

In some embodiments, the above library sample-dependent information is located at the head of the video track.

In some embodiments, the library sample-dependent information is contained in sample group information that depends on a library sample.

In some embodiments, the sample group information that depends on a library sample is located at the head of the video track.

If the above library sample-dependent information is located in the sample group information that depends on a library sample, the sample group information that depends on a library sample needs to be extended.

In one example, extended sample group information that depends on a library sample includes the following contents:

```
Grammar
class LibraryDependencySampleGroupEntry extend
VisualSampleGroupEntry ('libg'){
   unsigned int(1) default_library_track;
   bit(7) reserved;
   if(default_library_track == 0){
      unsigned int (32) library_track_ID;
   }
   unsigned int (32) library_sample_index;
}
Semantics
```

Semantics

When a value of default_library_track is 1, a library picture track on which samples in the group depend is a current track or is uniquely specified by a track reference 'a3lr'. When a value of is 0, a library picture track on which samples in the group depend is indicated by library_track_ID.

library_track_ID indicates a serial number of a track where a sample entry of a referenced sample pointed by this group is located.

library_sample_index indicates a serial number of a sample entry of a referenced sample pointed by this group.

In this embodiment, if the library picture track on which the samples in the group depend is the current track or is uniquely specified by the track reference 'a3lr', the serial number of the track where the sample entry of the referenced sample and the serial number of the sample entry of the referenced sample may not be indicated, thus reducing codons and improving the coding efficiency.

According to the media file encapsulation method in this embodiment of the present disclosure, the file encapsulation device obtains a video bit stream. The video bit stream includes at least one sequence header. Sequence header information corresponding to the video bit stream is determined according to the at least one sequence header, and the video bit stream is encapsulated to obtain a video track. The video track includes the sequence header information corresponding to the video bit stream. Therefore, after obtaining the video track, a file de-encapsulation device parses the sequence header information in the video track, and decodes the video bit stream according to the sequence header information, so that the video bit stream decoding efficiency can be improved. For example, when the video bit stream includes a plurality of duplicate sequence headers, one sequence header can be decoded to decode subsequent video bit streams, thus avoiding a problem of repeatedly decoding sequence headers. For another example, when the video bit stream includes a plurality of different sequence headers, the file de-encapsulation device determines, according to the plurality of different sequence headers before decoding the video bit stream, whether a decoder has an ability of decoding the video bit stream corresponding to the plurality of different sequence headers, thereby avoiding a problem that some video bit streams cannot be decoded after some video bit streams are decoded, and improving the video decoding efficiency.

The media file encapsulation method in this embodiment of the present disclosure is described above. A media file de-encapsulation method in an embodiment of the present disclosure will be described below in combination with example embodiments.

Figure 7:
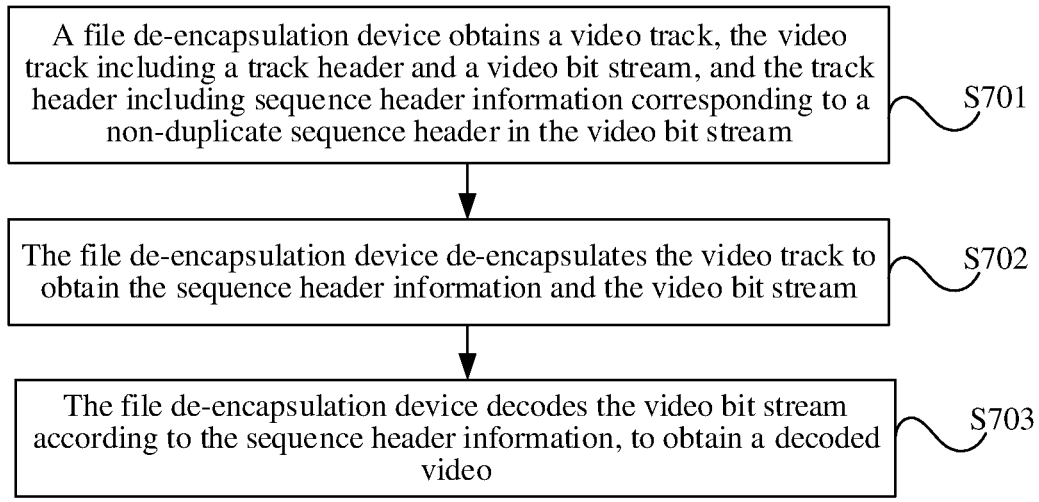
FIG. 7 is a flow diagram of a media file de-encapsulation method according to an embodiment of the present disclosure.

FIG. 7 is a flow diagram of a media file de-encapsulation method according to an embodiment of the present disclosure. As shown in FIG. 7, the method of this embodiment of the present disclosure includes:

S701. A file de-encapsulation device obtains a video track, the video track including a track header and a video bit stream, and the track header including sequence header information corresponding to a non-duplicate sequence header in the video bit stream.

In the present disclosure, manners used by the file de-encapsulation device to obtain a video track include but are not limited to the following several manners:

Manner I: The file de-encapsulation device receives a video track sent by a file encapsulation device. For example, the file encapsulation device sends the video track to the file de-encapsulation device after obtaining the video track by encapsulation according to the file encapsulation method of the above embodiment.

Manner II. The file de-encapsulation device obtains the video track from other storage devices (for example, a cloud server.) For example, the file encapsulation device sends the video track to a storage device, for example, a cloud server, after obtaining the video track by encapsulation according to the file encapsulation method of the above embodiment. When it is necessary to consume the video track, for example, when a consume request of a user is received, the file de-encapsulation device reads the video track from the storage device for the user to consume.

In some embodiments, the sequence header information includes the number of non-duplicate sequence headers or the number of duplicate sequence headers.

In some embodiments, the sequence header information includes at least one of a length of the sequence header, an identifier of the sequence header, syntactic element information of the sequence header, and a coded flag corresponding to the video bit stream.

A coded flag indicates a coding scanning manner used when the video bit stream is coded. For example, if a value of the coded flag is 1, it means that the video bit stream is a progressive scanning-based frame-coded code stream. If a value of the coded flag is 2, it means that the video bit stream is an interlaced scanning-based field-coded code stream. In some embodiments, value 1 is 0, and value 2 is 1.

In some embodiments, when the video track includes a main bit stream and a library bit stream, and values of all syntactic elements in a sequence header of the main bit stream other than a library bit stream flag, a library picture enable flag and a library bit stream duplicate sequence header flag are all the same as values of corresponding syntactic elements in a sequence header of a library bit stream referenced by the main bit stream, the number of the non-duplicate sequence header included in the sequence header information is 1, and the non-duplicate sequence header is the sequence header of the library bit stream.

In some embodiments, the sequence header information further includes at least one of a profile identifier, a level identifier, a chroma format, a sample precision, and a frame rate code.

The profile identifier indicates grade information of a video coding bit stream applicable to a current decoder configuration.

The level identifier indicates level information of the video coding bit stream applicable to the current decoder configuration record.

The chroma format indicates a chroma format of the video coding bit stream applicable to the current decoder configuration record.

The sample precision indicates a sample precision of the video coding bit stream applicable to the current decoder configuration record.

The frame rate code indicates a frame rate code of the video coding bit stream applicable to the current decoder configuration record.

In some embodiments, if the number N of the non-duplicate sequence headers is greater than 1, it is determined that a value of the profile identifier field is a maximum value among values of the profile identifier fields in the N sequence headers (namely, the N non-duplicate sequence headers); or,
  if the number N of the non-duplicate sequence headers is greater than 1, it is determined that a value of the level identifier field is a maximum value among values of the level identifier fields in the N sequence headers (namely, the N non-duplicate sequence headers); or,
  if the number N of the non-duplicate sequence headers is greater than 1, it is determined that values of the chroma format fields in the N sequence headers (namely, the N non-duplicate sequence headers) are the same; or,
  if the number N of the non-duplicate sequence headers is greater than 1, it is determined that a value of the sample precision field is a maximum value among values of the sample precision fields in the N sequence headers (namely, the N non-duplicate sequence headers); or,
  if the number N of the non-duplicate sequence headers is greater than 1, a value of the frame rate code field is determined based on frame rate information of sample sets in the video track.

This embodiment of the present disclosure does not limit a placement position of the above sequence header information in the video track.

In some embodiments, the sequence header information is located at a data entry of the video track. In this way, the file de-encapsulation device de-encapsulates the video track. The video track is first de-encapsulated to obtain the sequence header information, so that whether the file de-encapsulation device has an ability of decoding the video bit stream in the video track is determined according to the sequence header information. When it is determined that the file de-encapsulation device has the ability of decoding the video bit stream in the video track, the video bit stream is decoded according to the sequence header information, thereby avoiding such a problem of invalid decoding caused by decoding of part of the code stream.

In some embodiments, the sequence header information is located in current decoder configuration record information.

In some embodiments, if the sequence header information includes at least one of a profile identifier, a level identifier, a chroma format, a sample precision, and a frame rate code, the profile identifier, the level identifier, the chroma format, the sample precision or the frame rate code can multiplex the profile identifier, the level identifier, the chroma format, the sample precision or the frame rate code in the current decoder configuration record information.

S702. The file de-encapsulation device de-encapsulates the video track to obtain the sequence header information and the video bit stream.

S703. The file de-encapsulation device decodes the video bit stream according to the sequence header information, to obtain a decoded video.

In some embodiments, when an original video bit stream includes a plurality of duplicate sequence headers, the file encapsulation device of the present disclosure regards the plurality of duplicate sequence headers as one sequence header. The video track carries relevant information of one sequence header in the plurality of duplicate sequence headers. The file de-encapsulation device de-encapsulates the video track, and the obtained sequence header information is the relevant information of one sequence header in the plurality of duplicate sequence headers. The positions of any synchronous samples are decoded according to the relevant information of this sequence header, to achieve random decoding of the video bit stream. A problem of repeated decoding is avoided, thus improving the decoding efficiency.

In some embodiments, when an original video bit stream includes a plurality of different sequence headers, the file de-encapsulation device of the present disclosure places relevant information of the plurality of different sequence headers at the same position of the video track, for example, at the head of the video track. In this way, when the file de-encapsulation device de-encapsulates the video track, the relevant information of the plurality of different sequence headers can be obtained first, and then whether the file de-encapsulation device has an ability of decoding subsequent video bit streams is determined according to the relevant information of the plurality of different sequence headers. After it is determined that the file de-encapsulation device has the ability of decoding the subsequent video bit streams, video files corresponding to the various sequence headers are separately decoded according to the relevant information of the plurality of different sequence headers, so that a problem of invalid decoding caused by the following fact is avoided: It is found that the file de-encapsulation device does not have the ability of decoding a rear-end video bit stream after a front-end video bit stream is decoded. The video decoding efficiency and reliability are improved.

The following describes a specific decoding process involved in S703 above according to the different contents included in the video track.

In some embodiments, the video track further includes reference relation information when the number N of the non-duplicate sequence header is greater than 1. The reference relation information indicates a sample for reference to each sequence header.

Based on this, S703 above includes the following steps S703-A1 to S703-A3:

S703-A1. The file de-encapsulation device de-encapsulates the video track to obtain the reference relation information.

This embodiment of the present disclosure does not limit a specific placement position of the above reference relation information in the video track.

In some embodiments, in order to facilitate the decoding, the above reference relation information is placed at the head of the video track.

In some embodiments, the above reference relation information is contained in sequence header-dependent sample group information. In this way, the file de-encapsulation device can obtain the above reference relation information by means of parsing the sequence header-dependent sample group information, thus obtaining a sample for reference to each sequence header.

S703-A2. The file de-encapsulation device determines, for each of the N sequence headers, the sample for reference to the sequence header according to the reference relation information.

The reference relation information of the present disclosure indicates the sample, in the video track, for reference to each of the N sequence headers. For example, N=2, the reference relation information indicates samples, in the video track, with index numbers of 1 to 100 for reference to sequence header 1 and samples, in the video track, with index numbers of 101 to 200 for reference to sequence header 2.

In some embodiments, the reference relation information includes an index range of the sample for reference to each sequence header. At this time, S703-A2 above includes: determining the sample for reference to the sequence header according to the index range of the sample for reference to the sequence header. For example, sample_index_min and sample_index_max separately indicate a minimum value and a maximum value of the index range of the samples for reference to the sequence header. The file de-encapsulation device can determine the samples for reference to the sequence header according to sample_index_min and sample_index_max.

S703-A3. The file de-encapsulation device decodes the sample for reference to the sequence header according to the sequence header information corresponding to the sequence header, to obtain the decoded video.

For example, the samples with the index numbers of 1 to 100 refer to sequence header 1, and the file de-encapsulation device then decodes the samples with the index numbers of 1 to 100 according to the sequence header information corresponding to sequence header 1, for example, according to the sequence header syntactic element information of sequence header 1, to obtain frames of pictures with the index numbers of 1 to 100.

For another example, the samples with the index numbers of 101 to 200 refer to sequence header 2, and the file de-encapsulation device then decodes the samples with the index numbers of 101 to 200 according to the sequence header information corresponding to sequence header 2, for example, according to the sequence header syntactic element information of sequence header 2, to obtain frames of pictures with the index numbers of 101 to 200.

In this embodiment, the file encapsulation device adds the reference relation information to the video track when the number N of the non-duplicate sequence header is greater than 1. The reference relation information indicates the sample for reference to each sequence header. In this way, the file de-encapsulation device accurately determines, according to the reference relation information, samples corresponding to different sequence headers, thus achieving accurate decoding of the samples corresponding to different sequence headers, which further improves the decoding reliability.

In some embodiments, when the video track includes a main bit stream sample and a library picture sample, the video track further includes sample distinguishing information used for distinguishing the main bit stream sample from the library picture sample.

Based on this, S703 above includes the following steps S703-B1 to S703-B4:

S703-B1. The file de-encapsulation device de-encapsulates the video track to obtain the sample distinguishing information.

This embodiment of the present disclosure does not limit a specific placement position of the above sample distinguishing information in the video track.

In some embodiments, in order to facilitate the decoding, the above sample distinguishing information is placed at the head of the video track.

In some embodiments, the sample distinguishing information is located in library picture sample group information. In this way, the file de-encapsulation device obtains the above sample distinguishing information by means of parsing the library picture sample group information, thus obtaining the main bit stream sample and the library picture sample in the video track.

S703-B2. The file de-encapsulation device obtains the library picture sample and the main bit stream sample according to the sample distinguishing information.

In some embodiments, the sample distinguishing information includes an index range of any one of the main bit stream sample and the library picture sample.

In some embodiments, the sample distinguishing information includes an index range of the library picture sample in the video track. In this way, the file de-encapsulation device obtains the library picture sample in the video track according to the index range of the library picture sample in the video track, and determines the samples in the video track other than the library picture sample as the main bit stream sample.

S703-B3. The file de-encapsulation device decodes the library picture sample according to the sequence header information corresponding to the library picture sample, to obtain a library picture.

S703-B4. The file de-encapsulation device decodes the main bit stream sample according to the sequence header information corresponding to the main bit stream sample, and the library picture, to obtain the decoded video.

In some embodiments, the sequence headers corresponding to the library picture sample and the main bit stream sample are different. Therefore, during decoding, the file de-encapsulation device decodes the library picture sample according to the sequence header information corresponding to the library picture sample, to obtain the library picture, and decodes the main bit stream sample according to the sequence header information corresponding to the main bit stream sample, to obtain the decoded video.

In some embodiments, decoding the main bit stream sample needs to refer to the knowledge picture. Therefore, the file de-encapsulation device decodes the main bit stream sample according to the sequence header information corresponding to the main bit stream sample and the decoded library sample, to obtain the decoded video.

In this embodiment of the present disclosure, when the video track includes the main bit stream sample and the library picture sample, the file de-encapsulation device adds sample distinguishing information used for distinguishing the main bit stream sample from the library picture sample to the video track. In this way, after obtaining the video track, the file de-encapsulation device can distinguish the main bit stream sample from the library picture sample in the video track according to the sample distinguishing information in the video track, and separately decode the main bit stream sample and the library picture sample by using the sequence header information respectively corresponding to the main bit stream sample and the library picture sample, which achieves accurate decoding of a main bit stream and a library picture bit stream, and further improves the decoding efficiency and the reliability.

In some embodiments, when at least one sample in the video track depends on a library picture sample during coding, the video track further includes library sample-dependent information. The library sample-dependent information indicates information of a track with the library picture sample on which the at least one sample depends. The library sample-dependent information includes library picture track indication information, and the library picture track indication information indicates whether the library picture sample, on which the at least one sample depends, is located in the video track.

Based on this, S703 above includes the following steps S703-C1 to S703-C5:

S703-C1. The file de-encapsulation device de-encapsulates the video track to obtain the library sample-dependent information.

This embodiment of the present disclosure does not limit a specific placement position of the above library sample-dependent information in the video track.

In some embodiments, the above library sample-dependent information is located at the head of the video track.

In some embodiments, the library sample-dependent information is contained in sample group information that depends on a library sample. In this way, the file de-encapsulation device decodes the sample group information that depends on a library sample to obtain the library sample-dependent information.

S703-C2. The file de-encapsulation device determines, according to the library picture track indication information in the library sample-dependent information, a target track where the library picture sample, on which the at least one sample depends, is located.

For example, the file de-encapsulation device determines, when a value of the library picture track indication information is a first value (for example, 1), that a current video track is the target track, the first value being used for indicating that the library picture sample on which the at least one sample depends is located in the video track; and For another example, the library sample-dependent information further includes a library picture track identifier when a value of the library picture track indication information is a second value (for example, 0), and the library picture track identifier indicates an identifier of a track with the library picture sample on which the at least one sample depends. The file de-encapsulation device determines the target track according to a library picture track identifier included in the library sample-dependent information.

S703-C3. The file de-encapsulation device de-encapsulates the target track to obtain the library picture sample on which the at least one sample depends.

In some embodiments, if the target track is the current video track, it is indicated that the video track includes the library picture sample and the main bit stream sample. In this way, the library picture sample in the video track is obtained on the basis of S703-B1 and S703-B2.

In some embodiments, if the target track is not the current video track, the library sample-dependent information further includes a sample index library_sample_index of the library picture sample in the library picture track in addition to the library picture track identifier library_track_ID. In this way, the file de-encapsulation device obtains the target track according to the library picture track identifier library_track_ID, and obtains the library picture sample on which the at least one sample depends according to the sample index library_sample_index in the library picture track.

S703-C4. The file de-encapsulation device decodes the library picture sample on which the at least one sample depends, to obtain a library picture on which the at least one sample depends.

S703-C5. The file de-encapsulation device decodes the at least one sample according to the sequence header information corresponding to the at least one sample and the library picture on which the at least one sample depends, to obtain the decoded video.

When the at least one sample is decoded, parameters required for decoding the at least one sample are obtained from the sequence header information corresponding to the at least one sample, and the library picture is used as a reference picture. The at least one sample is decoded to obtain the decoded video. The specific process can refer to the existing decoding flow, which will not be repeated here.

In this embodiment of the present disclosure, if at least one sample in the video track depends on the library picture sample during coding, the file encapsulation device adds the library picture track indication information to the video track. The library picture track indication information indicates whether the library picture sample on which the at least one sample depends is located in the video track. When the library picture track is the current video track, it is not necessary to indicate an identifier of the library picture track and an identifier of the library sample in the library picture track, thus reducing transmission of codons while ensuring accurate decoding.

Further, in order to illustrate the technical solutions of the embodiments of the present disclosure, the methods of the embodiments of the present disclosure are applied to different scenarios for explanation.

Application scenario 1: File encapsulation is performed on a main bit stream containing duplicate sequence headers.

Step 11. A file encapsulation device obtains the main bit stream in which there is only one non-duplicate sequence header.

Step 12. The file encapsulation device encapsulates the main bit stream to obtain a video track, the video track including sequence header information.

In some embodiments, the sequence header information is located in a decoder configuration record of the video track.

The decoder configuration record includes the following contents:

general_profile_id, general_level_id, general_chroma_format, general_sample_precision, and general_frame_rate_code, where the general_frame_rate_code parameter is assigned according to relevant parameters in the sequence headers.

library_dependency=00 means that the video track is a main bit stream track and does not depend on a library picture track.

A value of temporal_layer_num is determined according to an actual condition of the main bit stream. It is assumed that the value is 0, which means that there is no temporal layer in the main bit stream.

general_field_coded_flag-0 means that a code stream corresponding to the video track is coded in frames.

sequence_header_num=1.

A value of sequence_header_length is determined according to an actual condition of a sequence header, and is assumed to be 24.

Step 13. The file encapsulation device sends the video track to a file de-encapsulation device.

Step 14. The file de-encapsulation device parses the sequence header information in the decoder configuration record in the video track, and then decodes samples in the video track in combination with parameter information in the sequence headers.

In some embodiments, the file de-encapsulation device can start decoding from the position of any synchronous sample of the video track according to the sequence header information obtained by parsing.

Application scenario 2: File encapsulation is performed on a main bit stream containing a plurality of different sequence headers.

Step 21. A file encapsulation device obtains the main bit stream in which two non-duplicate sequence headers exist.

Step 22. The file encapsulation device encapsulates the main bit stream to obtain a video track, the video track including sequence header information.

In some embodiments, the sequence header information is located in a decoder configuration record of the video track.

The decoder configuration record includes the following contents:

general_profile_id and general_level_id are the maximum values of corresponding parameters in the two sequence headers. The file de-encapsulation device can determine whether a decoder has a corresponding ability according to this field.

general_frame_rate_code indicates frame rate information of all samples of the video track. The file de-encapsulation device can determine corresponding decoder ability requirements according to this field.

The general_chroma_format and general_sample_precision parameters are assigned according to relevant parameters in the sequence headers.

library_dependency=00 means that the video track is a main bit stream track and does not depend on a library picture track.

A value of temporal_layer_num is determined according to an actual condition of the main bit stream. It is assumed that the value is 0, which means that there is no temporal layer in the main bit stream.

general_field_coded_Flag=0 means that a code stream corresponding to the video track is coded in frames.

sequence_header_num=2; {sequence_header_length=24; sequence_header_id=100}, {sequence_header_length=15; sequence_header_id=200}.

In step 22. The file encapsulation device defines a corresponding sequence header-dependent sample group according to a sequence header referenced during decoding of the samples in the video track. Frames 1 to 100 are classified into one group, and sequence_header_id in SequenceHeaderDependencySampleGroupEntry is equal to 100. Frames 101 to 200 are classified into one group, and sequence_header_id in SequenceHeaderDependencySampleGroupEntry is equal to 200.

Step 23. The file encapsulation device sends the video track to a file de-encapsulation device.

Step 24. The file de-encapsulation device parses the sequence header information in the decoder configuration record in the video track, and then decodes samples in the video track in combination with parameter information in the sequence headers.

Specifically, during decoding of frame samples 1 to 100, a sequence header with an identifier of 100 is referenced. during decoding of frame samples 101 to 200, a sequence header with an identifier of 200 is referenced.

In some embodiments, the file de-encapsulation device can start decoding from the position of any synchronous sample of the video track according to the sequence header information obtained by parsing.

Application scenario 3: A main bit stream and a library picture bit stream are encapsulated.

Step 31. A file encapsulation device obtains a video bit stream, the video bit stream including a main bit stream and a library picture bit stream.

Step 32. The file encapsulation device encapsulates the video bit stream to obtain a video track, the video track including sequence header information.

In some embodiments, the sequence header information is located in a decoder configuration record of the video track.

The decoder configuration record includes the following contents:

library_dependency=11.

a) If a value of the duplicate_sequence_header_flag field in the sequence header of the main bit stream is 1, a value of sequence_header_num is 1, and the sequence header contained in the current decoder configuration record is a sequence header of the library picture bit stream. At this time, the parameters general_profile_id, general_level_id, general_chroma_format, general_sample_precision and general_frame_rate_code are assigned according to the relevant parameters in the sequence header of the library picture bit stream. A value of temporal_layer_num is determined according to an actual condition of the main bit stream. It is assumed that the value is 0, which means that there is no temporal layer in the main bit stream.

general_field_coded_flag=0 means that a code stream corresponding to the track is coded in frames.

sequence_header_num=1; A value of sequence_header_length is determined according to an actual condition of a sequence header, and is assumed to be 24.

b) If a value of duplicate_sequence_header_flag in the sequence header of the main bit stream is 0, a value of sequence_header_num is to be 2. At this time, general_profile_id and general_level_id are the maximum values of corresponding parameters in the two sequence headers. The file de-encapsulation device can determine whether a decoder has a corresponding ability according to this field.

general_frame_rate_code indicates frame rate information of all samples of the video track. The file de-encapsulation device can determine corresponding decoder ability requirements according to this field.

The general_chroma_format and general_sample_precision parameters are assigned according to relevant parameters in the sequence headers. A value of temporal_layer_num is determined according to an actual condition of the main bit stream. It is assumed that the value is 0, which means that there is no temporal layer in the main bit stream.

general_field_coded_flag=0 means that a code stream corresponding to the video track is coded in frames.

sequence_header_num=2; {sequence_header_length=24; sequence_header_id=100}, {sequence_header_length=15; sequence_header_id=200}.

Step 33. For reference to a sequence header, the file encapsulation device determines, according to the main bit stream and the library picture bit stream, whether to use the same sequence header. The processing method is similar to those in Scenario 1 and Scenario 2 above.

Step 34. The file encapsulation device defines a library picture sample group and identifies a library picture sample in the track. Samples in a non-library picture sample group are samples of the main bit stream.

Step 35. The file encapsulation device defines a sample group that depends on a library sample. At this time, the default_library_track=1, which means that it is not necessary to indicate an ID of the library picture track because the current video track is a track containing a library picture.

Step 36. The file encapsulation device sends the video track to a file de-encapsulation device.

Step 37. After obtaining the video track, the file de-encapsulation device parses the sequence header information in the decoder configuration record, and then decodes the samples in the video track in combination with parameter information in the sequence headers.

a) If sequence_header_num=1, decoding all the samples in the video track refers to the same sequence header.
b) If sequence_header_num=2, decoding library picture frames refers to a sequence header with an identifier of 100. Decoding main bit stream frames refers to a sequence header with an identifier of 200, and whether to refer to a specific library picture frame is determined according to the information in the sample group that depends on a library sample.

At the same time, the file de-encapsulation device can identify the library picture frame and the main bit stream frame through the library picture sample group, and only output the main bit stream frame on a display device, without outputting the library picture frame.

It is understood that FIG. 6 and FIG. 7 are only examples of the present disclosure and are not construed as restrictions on the present disclosure.

The preferred implementations of the present disclosure are described in detail above with reference to the accompanying drawings. However, the present disclosure is not limited to the specific details in the foregoing implementations. Various simple transformations may be made to the technical solutions of the present disclosure within a range of the technical concept of the present disclosure, and these simple transformations fall within the protection scope of the present disclosure. For example, the various specific technical features described in the foregoing specific implementations may be combined in any proper manner without conflicts. In order to avoid unnecessary repetitions, the present disclosure will not additionally describe various possible combination manners. For another example, various different implementations of the present disclosure may also be arbitrarily combined without departing from the idea of the present disclosure, and these combinations shall still be regarded as content disclosed in the present disclosure.

The above describes the method embodiments of the present disclosure in detail in combination with FIG. 6 to FIG. 7. The apparatus embodiments of the present disclosure are described in detail below.

Figure 8:
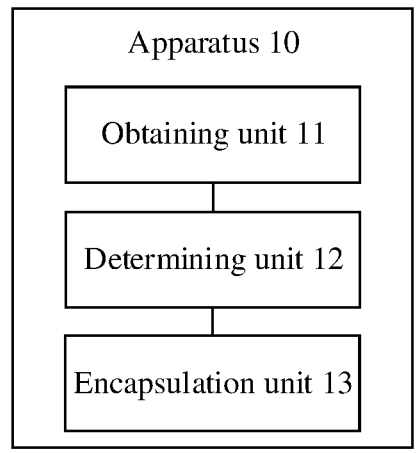
FIG. 8 is a schematic structural diagram of a media file encapsulation apparatus according to an embodiment of the present disclosure.

FIG. 8 is a schematic structural diagram of a media file encapsulation apparatus according to an embodiment of the present disclosure. The apparatus 10 is applied to a file encapsulation device. The apparatus 10 includes:

an obtaining unit 11, configured to obtain a video bit stream, the video bit stream including at least one sequence header;

a determining unit 12, configured to determine, according to the at least one sequence header, sequence header information corresponding to the video bit stream; and an encapsulation unit 13, configured to encapsulate the video bit stream to obtain a video track, the video track including sequence header information corresponding to a non-duplicate sequence header in the video bit stream.

In some embodiments, the sequence header information includes the number of non-duplicate sequence headers or the number of duplicate sequence headers.

In some embodiments, the determining unit 12 is specifically configured to: when the video bit stream includes a main bit stream and a library bit stream, and values of all syntactic elements in a sequence header of the main bit stream other than a library bit stream flag, a library picture enable flag and a library bit stream duplicate sequence header flag are all the same as values of corresponding syntactic elements in a sequence header of a library bit stream referenced by the main bit stream, determine that the number of the non-duplicate sequence header is 1 and that the non-duplicate sequence header is the sequence header of the library bit stream.

In some embodiments, the sequence header information further includes at least one of a profile identifier, a level identifier, a chroma format, a sample precision, and a frame rate code.

If the number N of the non-duplicate sequence headers is greater than 1, a value of the profile identifier field is a maximum value among values of the profile identifier fields in the N sequence headers (namely, the N non-duplicate sequence headers); or, if the number N of the non-duplicate sequence headers is greater than 1, a value of the level identifier field is a maximum value among values of the level identifier fields in the N sequence headers (namely, the N non-duplicate sequence headers); or, if the number N of the non-duplicate sequence headers is greater than 1, values of the chroma format fields in the N sequence headers (namely, the N non-duplicate sequence headers) are the same; or, if the number N of the non-duplicate sequence headers is greater than 1, a value of the sample precision field is a maximum value among values of the sample precision fields in the N sequence headers (namely, the N non-duplicate sequence headers); or, if the number N of the non-duplicate sequence headers is greater than 1, a value of the frame rate code field is determined based on frame rate information of sample sets in the video track.

In some embodiments, the sequence header information includes at least one of a length of the sequence header, an identifier of the sequence header, syntactic element information of the sequence header, and a coded flag corresponding to the video bit stream; and the coded flag indicates an encoding scanning manner used when the video bit stream is coded.

In some embodiments, the sequence header information is located at a data entry of the video track.

In some embodiments, the sequence header information is located in current decoder configuration record information.

In some embodiments, the video track further includes reference relation information when the number N of the non-duplicate sequence header is greater than 1. The reference relation information indicates a sample for reference to each sequence header.

In some embodiments, the reference relation information includes an index range of the sample for reference to each sequence header.

In some embodiments, the reference relation information is contained in sequence header-dependent sample group information.

In some embodiments, when the video track includes a main bit stream sample and a library picture sample, the video track further includes sample distinguishing information used for distinguishing the main bit stream sample from the library picture sample.

In some embodiments, the sample distinguishing information includes an index range of any one of the main bit stream sample and the library picture sample.

In some embodiments, the sample distinguishing information is located in library picture sample group information.

In some embodiments, when at least one sample in the video track depends on a library picture sample during coding, the video track further includes library sample-dependent information; the library sample-dependent information indicates information of a track with the library picture sample on which the at least one sample depends.

The library sample-dependent information includes library picture track indication information, and the library picture track indication information indicates whether the library picture sample, on which the at least one sample depends, is located in the video track.

In some embodiments, it is indicated, when a value of the library picture track indication information is a first value, that the library picture sample, on which the at least one sample depends, is located in the video track. The library sample-dependent information further includes a library picture track identifier when a value of the library picture track indication information is a second value, and the library picture track identifier indicates an identifier of a track with the library picture sample on which the at least one sample depends.

In some embodiments, the library sample-dependent information is contained in sample group information that depends on a library sample.

It is understood that the apparatus embodiments may correspond to the method embodiments, so that similar descriptions may refer to the method embodiments. In order to avoid repetitions, details are not described herein again. Specifically, the apparatus 10 shown in FIG. 8 may implement the method embodiment corresponding to the file encapsulation device, and the foregoing and other operations and/or functions of the various modules in the apparatus 10 respectively implement the method embodiment corresponding to the file encapsulation device. For simplicity, repeated descriptions will be omitted here.

Figure 9:
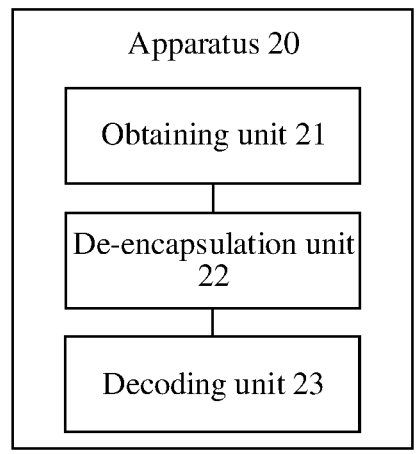
FIG. 9 is a schematic structural diagram of a media file de-encapsulation apparatus according to an embodiment of the present disclosure.

FIG. 9 is a schematic structural diagram of a media file de-encapsulation apparatus according to an embodiment of the present disclosure. The apparatus 20 is applied to a file de-encapsulation device. The apparatus 20 includes:
- an obtaining unit 21, configured to obtain a video track, the video track including a track header and a video bit stream, and the track header including sequence header information corresponding to a non-duplicate sequence header in the video bit stream;
- a de-encapsulation unit 22, configured to de-encapsulate the video track to obtain the sequence header information and the video bit stream; and
- a decoding unit 23, configured to decode the video bit stream according to the sequence header information, to obtain a decoded video.

In some embodiments, the sequence header information includes the number of non-duplicate sequence headers or the number of duplicate sequence headers.

In some embodiments, when the video track includes a main bit stream and a library bit stream, and values of all syntactic elements in a sequence header of the main bit stream other than a library bit stream flag, a library picture enable flag and a library bit stream duplicate sequence header flag are all the same as values of corresponding syntactic elements in a sequence header of a library bit stream referenced by the main bit stream, the number of the non-duplicate sequence header included in the sequence header information is 1, and the non-duplicate sequence header is the sequence header of the library bit stream.

In some embodiments, the sequence header information further includes at least one of a profile identifier, a level identifier, a chroma format, a sample precision, and a frame rate code.

If the number N of the non-duplicate sequence headers is greater than 1, a value of the profile identifier field is a maximum value among values of the profile identifier fields in the N sequence headers; or,
  if the number N of the non-duplicate sequence headers is greater than 1, a value of the level identifier field is a maximum value among values of the level identifier fields in the N sequence headers; or,
  if the number N of the non-duplicate sequence headers is greater than 1, values of the chroma format fields in the N sequence headers are the same; or,
  if the number N of the non-duplicate sequence headers is greater than 1, a value of the sample precision field is a maximum value among values of the sample precision fields in the N sequence headers; or,
  if the number N of the non-duplicate sequence headers is greater than 1, a value of the frame rate code field is determined based on frame rate information of sample sets in the video track.

In some embodiments, the sequence header information includes at least one of a length of the sequence header, an identifier of the sequence header, syntactic element information of the sequence header, and a coded flag corresponding to the video bit stream; and the coded flag indicates an encoding scanning manner used when the video bit stream is coded.

In some embodiments, the sequence header information is located at a data entry of the video track.

In some embodiments, the sequence header information is located in current decoder configuration record information.

In some embodiments, the video track further includes reference relation information when the number N of the non-duplicate sequence header is greater than 1. The reference relation information indicates a sample for reference to each sequence header. The decoding unit 23 is specifically configured to: de-encapsulate the video track to obtain the reference relation information; determine, for each of the N sequence headers, the sample for reference to the sequence header according to the reference relation information; and decode the sample for reference to the sequence header according to the sequence header information corresponding to the sequence header, to obtain the decoded video.

In some embodiments, the reference relation information includes an index range of the sample for reference to each sequence header, and the decoding unit 23 is specifically configured to determine the sample for reference to the sequence header according to the index range of the sample for reference to the sequence header.

In some embodiments, the reference relation information is contained in sequence header-dependent sample group information.

In some embodiments, when the video track includes a main bit stream sample and a library picture sample, the video track further includes sample distinguishing information used for distinguishing the main bit stream sample from the library picture sample. The decoding unit 23 is configured to: de-encapsulate the video track to obtain the sample distinguishing information; obtain the library picture sample and the main bit stream sample according to the sample distinguishing information; decode the library picture sample according to the sequence header information corresponding to the library picture sample, to obtain a library picture; and decode the main bit stream sample according to the sequence header information corresponding to the main bit stream sample, and the library picture, to obtain the decoded video.

In some embodiments, the sample distinguishing information includes an index range of any one of the main bit stream sample and the library picture sample.

In some embodiments, the sample distinguishing information is located in library picture sample group information.

In some embodiments, when at least one sample in the video track depends on a library picture sample during coding, the video track further includes library sample-dependent information; the library sample-dependent information indicates information of a track with the library picture sample on which the at least one sample depends; the library sample-dependent information includes library picture track indication information; and the library picture track indication information indicates whether the library picture sample, on which the at least one sample depends, is located in the video track.

The decoding unit 23 is configured to: de-encapsulate the video track to obtain the library sample-dependent information; determine, according to the library picture track indication information in the library sample-dependent information, a target track where the library picture sample, on which the at least one sample depends, is located; and de-encapsulate the target track to obtain the library picture sample on which the at least one sample depends; decode the library picture sample on which the at least one sample depends, to obtain a library picture on which the at least one sample depends; and decode the at least one sample according to the sequence header information corresponding to the at least one sample and the library picture on which the at least one sample depends, to obtain the decoded video.

In some embodiments, the decoding unit 23 is configured to: determine, when a value of the library picture track indication information is a first value, that the video track is the target track, the first value being used for indicating that the library picture sample on which the at least one sample depends is located in the video track; and determine the target track according to a library picture track identifier in the library sample-dependent information when a value of the library picture track indication information is a second value, the library picture track identifier being used for indicating an identifier of a track with the library picture sample on which the at least one sample depends.

In some embodiments, the library sample-dependent information is contained in sample group information that depends on a library sample.

It is understood that the apparatus embodiments may correspond to the method embodiments, so that similar descriptions may refer to the method embodiments. In order to avoid repetitions, details are not described herein again. Specifically, the apparatus 20 shown in FIG. 9 may implement the method embodiment corresponding to a server, and the foregoing and other operations and/or functions of the various modules in the apparatus 20 respectively implement the method embodiment corresponding to a file de-encapsulation device. For simplicity, repeated descriptions will be omitted here.

The above describes the apparatus of this embodiment of the present disclosure in terms of functional modules in combination with the drawings. It is understood that the functional modules may be implemented in the form of hardware or through instructions in the form of software, or may be implemented in the form of a combination of hardware and software modules. Specifically, the various steps of the method embodiments in the embodiments of the present disclosure may be completed by using an integrated logic circuit of hardware in a processor and/or instructions in the form of software. The steps of the methods disclosed in the embodiments of the present disclosure can be directly performed and completed by a hardware decoding processor, or performed and completed by combining hardware and software modules in a decoding processor. In some embodiments, the software module may be located in a storage medium that is mature in the art, such as a random access memory, a flash memory, a read-only memory, a programmable read-only memory, an electrically erasable programmable memory, or a register. The storage medium is located in a memory. A processor reads information in the memory and completes the steps of the method embodiments in combination with hardware thereof.

Figure 10:
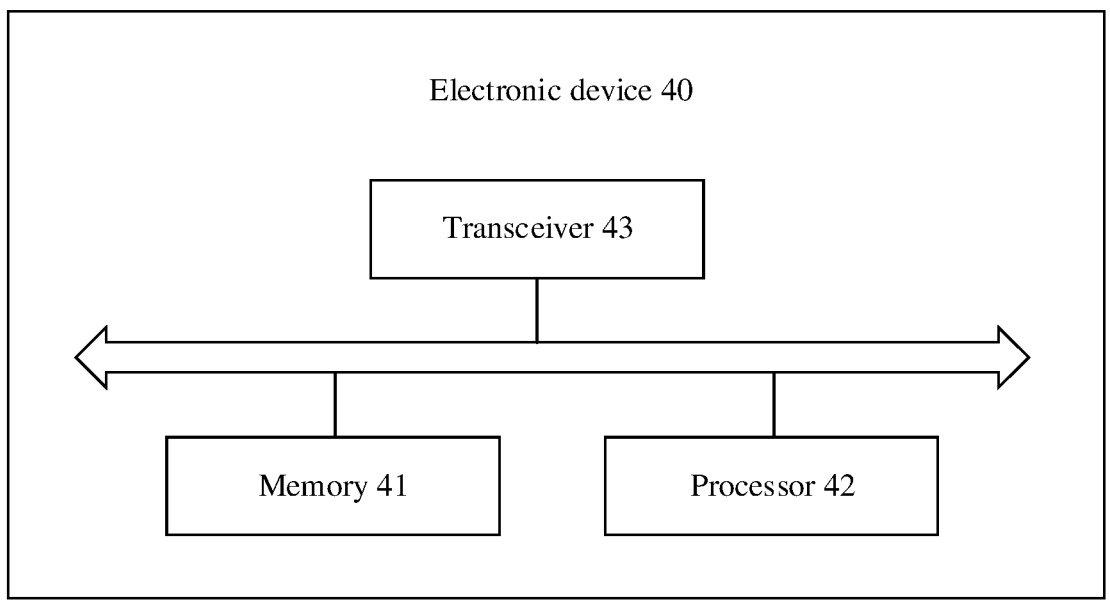
FIG. 10 is a schematic block diagram of an electronic device according to an embodiment of the present disclosure.

FIG. 10 is a schematic block diagram of an electronic device according to an embodiment of the present disclosure. The electronic device may be the above-mentioned file encapsulation device or file de-encapsulation device, or the electronic device has functions of the file encapsulation device and the file de-encapsulation device.

As shown in FIG. 10, the electronic device 40 may include:

a memory 41 and a processor 42, the memory 41 being configured to store a computer program and transmit a program code to the processor 42. In other words, the processor 42 may invoke and run the computer program from the memory 41 to implement the methods in the embodiments of the present disclosure.

For example, the processor 42 may be configured to execute the foregoing method embodiments according to instructions in the computer program.

In some embodiments of the present disclosure, the processor 42 may include but not limited to:

a general-purpose processor, a digital signal processor (DSP), an application specific integrated circuit (ASIC), a field programmable gate array (FPGA), other programmable logic devices, discrete gate or transistor logic devices, discrete hardware components, or the like.

In some embodiments of the present disclosure, the memory 41 includes but is not limited to:

a volatile memory and/or a non-volatile memory. The non-volatile memory may be a read-only memory (ROM), a programmable ROM (PROM), an erasable PROM (EPROM), an electrical EPROM (EEPROM), or a flash memory. The volatile memory may be a random access memory (RAM) serving as an external cache. By way of examples, not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), and a Direct Rambus RAM (DR RAM).

In some embodiments of the present disclosure, the computer program may be divided into one or more modules that are stored in the memory 41 and executed by the processor 42 to complete the methods provided by the present disclosure. The one or more modules may be a series of computer program instruction segments capable of completing specific functions, and the instruction segments are used for describing an execution process of the computer program in the video making device.

As shown in FIG. 10, the electronic device 40 may further include:

a transceiver 43, the transceiver 43 being capable of being connected to the processor 42 or the memory 41.

The processor 42 may control the transceiver 43 to communicate with other devices. Specifically, the processor may transmit information or data to or receive information or data from other devices. The transceiver 43 may include a transmitter and a receiver. The transceiver 43 may further include antennas, and the number of the antennas may be one or more.

Various components in the video making device are connected by using a bus system. In addition to a data bus, the bus system may also include a power bus, a control bus, and a status signal bus.

The present disclosure further provides a computer storage medium, configured to store a computer program which, when executed by a computer, causes the computer to implement the methods of the above method embodiments. Or, the embodiments of the present disclosure further provide a computer program product including instructions. The instructions, when executed by a computer, cause the computer to implement the methods of the above method embodiments.

All the technical features of the above embodiments can be combined in different manners to form other embodiments. For the sake of brevity, all possible combinations of all the technical features in the above embodiments are not described. However, these technical features shall all be considered to fall within the scope of this specification as long as there is no contradiction in their combinations.

What is claimed is:

1. A media file de-encapsulation method, which is applied to a file de-encapsulation device, and comprises:

obtaining a video track, the video track comprising a track header and a video bit stream, and the track header comprising sequence header information corresponding to a non-duplicate sequence header in the video bit stream, wherein the sequence header information comprises a number of non-duplicate sequence headers or a number of duplicate sequence headers, the video track further comprises reference relation information when the number N of the non-duplicate sequence header is greater than 1, the reference relation information indicates a sample for reference to each sequence header and comprises an index range of the sample for reference to each sequence header;

de-encapsulating the video track to obtain the sequence header information and the video bit stream; and decoding the video bit stream according to the sequence header information, to obtain a decoded video, comprising:

de-encapsulating the video track to obtain the reference relation information;

determining, for each of the N sequence headers, the sample for reference to the sequence header according to the index range of the sample for reference to the sequence header; and decoding the sample for reference to the sequence header according to the sequence header information corresponding to the sequence header, to obtain the decoded video.

2. The method according to claim 1, wherein when the video track comprises a main bit stream and a library bit stream, and values of all syntactic elements in a sequence header of the main bit stream other than a library bit stream flag, a library picture enable flag and a library bit stream duplicate sequence header flag are the same as values of corresponding syntactic elements in a sequence header of a library bit stream referenced by the main bit stream, the number of the non-duplicate sequence header comprised in the sequence header information is 1, and the non-duplicate sequence header is the sequence header of the library bit stream.

3. The method according to claim 1, wherein the sequence header information further comprises at least one of a profile identifier, a level identifier, a chroma format, a sample precision, or a frame rate code;

the method further comprises: performing one of the following when the number N of the non-duplicate sequence header is greater than 1:

determining that a value of the profile identifier field is a maximum value among values of profile identifier fields in the N sequence headers;

determining that a value of the level identifier field is a maximum value among values of level identifier fields in the N sequence headers;

determining that values of chroma format fields in the N sequence header are the same;

determining that a value of the sample precision field is a maximum value among values of sample precision fields in the N sequence headers; and determining a value of the frame rate code field based on frame rate information of sample sets in in the video track.

4. The method according to claim 1, wherein when the video track comprises a main bit stream sample and a library picture sample, the video track further comprises sample distinguishing information used for distinguishing the main bit stream sample from the library picture sample; and the decoding the video bit stream according to the sequence header information, to obtain a decoded video comprises:

de-encapsulating the video track to obtain the sample distinguishing information; obtaining the library picture sample and the main bit stream sample according to the sample distinguishing information;

decoding the library picture sample according to the sequence header information corresponding to the library picture sample, to obtain a library picture; and decoding the main bit stream sample according to the sequence header information corresponding to the main bit stream sample, and the library picture, to obtain the decoded video.

5. The method according to claim 4, wherein the sample distinguishing information comprises an index range of one of the main bit stream sample and the library picture sample, and the sample distinguishing information is contained in library picture sample group information.

6. The method according to claim 1, wherein when at least one sample in the video track depends on a library picture sample during coding, the video track further comprises library sample-dependent information; the library sample-dependent information indicates information of a track with the library picture sample on which the at least one sample depends; the library sample-dependent information comprises library picture track indication information, and the library picture track indication information indicates whether the library picture sample, on which the at least one sample depends, is located in the video track; and the decoding the video bit stream according to the sequence header information, to obtain a decoded video comprises:

de-encapsulating the video track to obtain the library sample-dependent information;

determining, according to the library picture track indication information in the library sample-dependent information, a target track where the library picture sample, on which the at least one sample depends, is located; and de-encapsulating the target track to obtain the library picture sample on which the at least one sample depends;

decoding the library picture sample on which the at least one sample depends, to obtain a library picture on which the at least one sample depends; and decoding the at least one sample according to the sequence header information corresponding to the at least one sample and the library picture on which the at least one sample depends, to obtain the decoded video.

7. The method according to claim 6, wherein the determining, according to the library picture track indication information in the library sample-dependent information, a target track where the library picture sample, on which the at least one sample depends, is located comprises:

determining, when a value of the library picture track indication information is a first value, that the video track is the target track, the first value being used for indicating that the library picture sample on which the at least one sample depends is located in the video track; and determining the target track according to a library picture track identifier in the library sample-dependent information when a value of the library picture track indication information is a second value, the library picture track identifier indicating an identifier of a track with the library picture sample on which the at least one sample depends.

8. The method according to claim 6, wherein the library sample-dependent information is contained in sample group information that depends on a library sample.

9. The method according to claim 1, wherein the sequence header information comprises at least one of a length of the sequence header, an identifier of the sequence header, syntactic element information of the sequence header, or a coded flag corresponding to the video bit stream; and the coded flag indicates a coding scanning manner used when the video bit stream is coded.

10. The method according to claim 1, wherein the sequence header information is located at a data entry of the video track.

11. The method according to claim 1, wherein the sequence header information is contained in current decoder configuration record information.

12. The method according to claim 1, wherein the reference relation information is contained in sequence header-dependent sample group information.

13. A non-transitory computer-readable storage medium, storing a computer program, the computer program, when being executed by at least one processor of a file de-encapsulation device, causing the at least one processor to perform:

obtaining a video track, the video track comprising a track header and a video bit stream, and the track header comprising sequence header information corresponding to a non-duplicate sequence header in the video bit stream, wherein the sequence header information comprises a number of non-duplicate sequence headers or a number of duplicate sequence headers, the video track further comprises reference relation information when the number N of the non-duplicate sequence header is greater than 1, the reference relation information indicates a sample for reference to each sequence header and comprises an index range of the sample for reference to each sequence header;

de-encapsulating the video track to obtain the sequence header information and the video bit stream; and decoding the video bit stream according sequence header information, to obtain a decoded video, comprising:

de-encapsulating the video track to obtain the reference relation information;

determining, for each of the N sequence headers, the sample for reference to the sequence header according to the index range of the sample for reference to the sequence header; and decoding the sample for reference to the sequence header according to the sequence header information corresponding to the sequence header, to obtain the decoded video.

14. A media file de-encapsulation apparatus, which is applied to a file de-encapsulation device, and comprises:

at least one processor and at least one memory, the at least one memory being configured to store a computer program, and the at least one processor being configured to invoke and operate the computer program stored in the at least one memory, to implement:

obtaining a video track, the video track comprising a track header and a video bit stream, and the track header comprising sequence header information corresponding to a non-duplicate sequence header in the video bit stream, wherein the sequence header information comprises a number of non-duplicate sequence headers or a number of duplicate sequence headers, the video track further comprises reference relation information when the number N of the non-duplicate sequence header is greater than 1, the reference relation information indicates a sample for reference to each sequence header and comprises an index range of the sample for reference to each sequence header;

de-encapsulating the video track to obtain the sequence header information and the video bit stream; and decoding the video bit stream according to the sequence header information, to obtain a decoded video, comprising:

de-encapsulating the video track to obtain the reference relation information;

determining, for each of the N sequence headers, the sample for reference to the sequence header according to the index range of the sample for reference to the sequence header; and decoding the sample for reference to the sequence header according to the sequence header information corresponding to the sequence header, to obtain the decoded video.

15. The apparatus according to claim 14, wherein when the video track comprises a main bit stream and a library bit stream, and values of all syntactic elements in a sequence header of the main bit stream other than a library bit stream flag, a library picture enable flag and a library bit stream duplicate sequence header flag are the same as values of corresponding syntactic elements in a sequence header of a library bit stream referenced by the main bit stream, the number of the non-duplicate sequence header comprised in the sequence header information is 1, and the non-duplicate sequence header is the sequence header of the library bit stream.

16. The apparatus according to claim 14, wherein the sequence header information further comprises at least one of a profile identifier, a level identifier, a chroma format, a sample precision, or a frame rate code; and
- the at least one processor is further configured to perform one of the following when the number N of the non-duplicate sequence header is greater than 1:
- determining that a value of the profile identifier field is a maximum value among values of profile identifier fields in the N sequence headers;
- determining that a value of the level identifier field is a maximum value among values of level identifier fields in the N sequence headers;
- determining that values of chroma format fields in the N sequence header are the same;
- determining that a value of the sample precision field is a maximum value among values of sample precision fields in the N sequence headers; and
- determining a value of the frame rate code field based on frame rate information of sample sets in the video track.

* * * * *